United States Patent
Choi et al.

(10) Patent No.: US 10,433,306 B2
(45) Date of Patent: Oct. 1, 2019

(54) METHOD FOR CONFIGURING FRAME INCLUDING SIGNAL FIELD INCLUDING CONTROL INFORMATION FOR DATA FIELD IN WIRELESS LOCAL AREA NETWORK SYSTEM AND APPARATUS THEREFOR

(71) Applicant: LG ELECTRONICS INC., Seoul (KR)

(72) Inventors: Jinsoo Choi, Seoul (KR); Hangyu Cho, Seoul (KR); Dongguk Lim, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 23 days.

(21) Appl. No.: 15/467,952

(22) Filed: Mar. 23, 2017

(65) Prior Publication Data

US 2017/0280452 A1 Sep. 28, 2017

Related U.S. Application Data

(60) Provisional application No. 62/311,915, filed on Mar. 23, 2016.

(51) Int. Cl.
*H04W 72/04* (2009.01)
*H04W 84/12* (2009.01)

(52) U.S. Cl.
CPC ........ *H04W 72/0453* (2013.01); *H04W 84/12* (2013.01)

(58) Field of Classification Search
CPC ............... H04W 72/04; H04W 72/042; H04W 72/0453; H04W 84/12
See application file for complete search history.

(56) References Cited

U.S. PATENT DOCUMENTS

| | | | |
|---|---|---|---|
| 2015/0146653 A1* | 5/2015 | Zhang | H04L 5/0041 370/329 |
| 2015/0373587 A1* | 12/2015 | Josiam | H04W 28/20 370/338 |
| 2016/0302200 A1* | 10/2016 | Yang | H04W 72/0446 |
| 2016/0316473 A1* | 10/2016 | Wang | H04W 72/0453 |
| 2016/0330738 A1* | 11/2016 | Eitan | H04W 72/0446 |
| 2017/0006608 A1* | 1/2017 | Josiam | H04L 5/00 |
| 2017/0064718 A1* | 3/2017 | Bharadwaj | H04W 72/0493 |
| 2017/0181136 A1* | 6/2017 | Bharadwaj | H04B 7/0452 |
| 2017/0257867 A1* | 9/2017 | Huang | H04W 72/0453 |
| 2017/0273083 A1* | 9/2017 | Chen | H04L 1/0071 |

* cited by examiner

*Primary Examiner* — Scott M Sciacca
(74) *Attorney, Agent, or Firm* — Lee Hong Degerman Kang & Waimey

(57) ABSTRACT

It is proposed an example for mapping between a signal field and a data field used in a wireless local area network (LAN) system supporting a plurality of resource units (RUs). If a second channel (e.g., a 20 MHz band) is nullified and thus a physical layer protocol data unit (PPDU) is not transmitted, a signal field transmitted through a first channel may include allocation information regarding all data channels, and a signal field transmitted through the first channel is preferably duplicated on a third channel. In this case, a signal field transmitted through a fourth channel may include only allocation information for a data field corresponding to the fourth channel.

10 Claims, 27 Drawing Sheets

METHOD FOR CONFIGURING FRAME INCLUDING SIGNAL FIELD INCLUDING CONTROL INFORMATION FOR DATA FIELD IN WIRELESS LOCAL AREA NETWORK SYSTEM AND APPARATUS THEREFOR

CROSS-REFERENCE TO RELATED APPLICATION

Pursuant to 35 U.S.C. § 119(e), this application claims the benefit of U.S. Provisional Patent Application No. 62/311,915, filed on Mar. 23, 2016, the contents of which are hereby incorporated by reference herein in its entirety.

BACKGROUND

1. Technical Field

The present specification relates to a technique of transmitting and receiving data in wireless communication, and more particularly, to a method and apparatus for configuring a signal field including control information in a wireless local area network (LAN) system.

2. Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY

The present specification proposes a method of configuring a signal field of a physical layer protocol data unit (PPDU) for a wireless local area network (LAN) system.

The present specification proposes a signal field of a PPDU exhibiting improved performance for resource allocation.

An example of the present specification proposes a method and apparatus applied to a wireless LAN system. An example of the present specification proposes an improved example for control information indicated by a signal field (i.e., a control field) of a PPDU.

Specifically, a method according to an example of the present specification may be applied to a wireless LAN system which uses a resource unit (RU) corresponding to a pre-set frequency band.

The method includes configuring a PPDU including a first data field transmitted through a first frequency band, a third data field transmitted through a third frequency band, and a fourth data field transmitted through a fourth frequency band, wherein the PPDU does not include a data field on a second frequency band, and the second frequency band is configured between the first frequency band and the third frequency band. In this case, the second frequency band may be nullified so that no signal is transmitted.

The PPDU may include a first signal field transmitted through a first signal channel corresponding to the first frequency band, a third signal field transmitted through a third signal channel corresponding to the third frequency band, and a fourth signal field transmitted through a fourth signal channel corresponding to the fourth frequency band.

The first signal field may include identification information for a station (STA) to be allocated to the first, third, and fourth data fields, and may further include allocation information for an RU to be allocated to the first, third, and fourth data fields.

The third signal field may be a field which is a duplication of the first signal field.

The fourth signal field may include identification information for an STA to be allocated to the fourth data field, and may further include allocation information for an RU to be allocated for the fourth data field.

DESCRIPTION OF EXEMPLARY EMBODIMENTS

Figure 1:
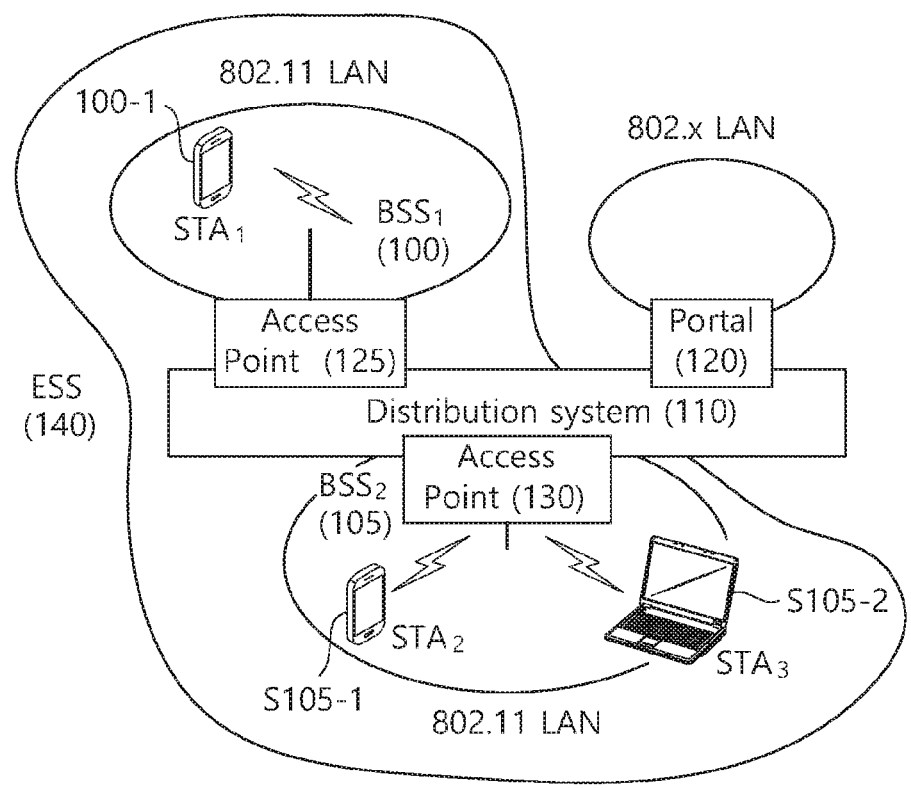
FIG. 1 is a conceptual view illustrating a structure of a wireless local area network (WLAN).
Figure 1:
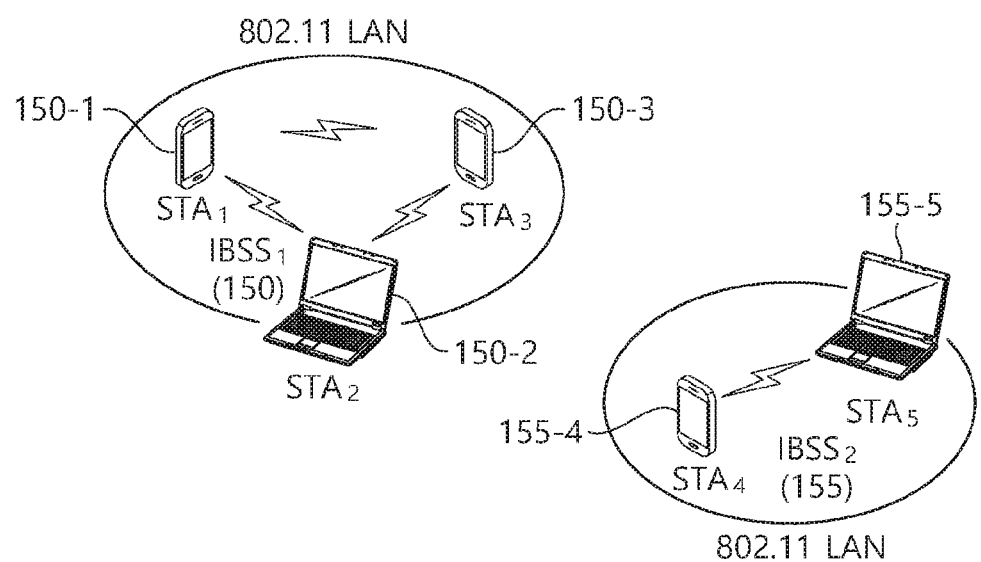

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Figure 2:
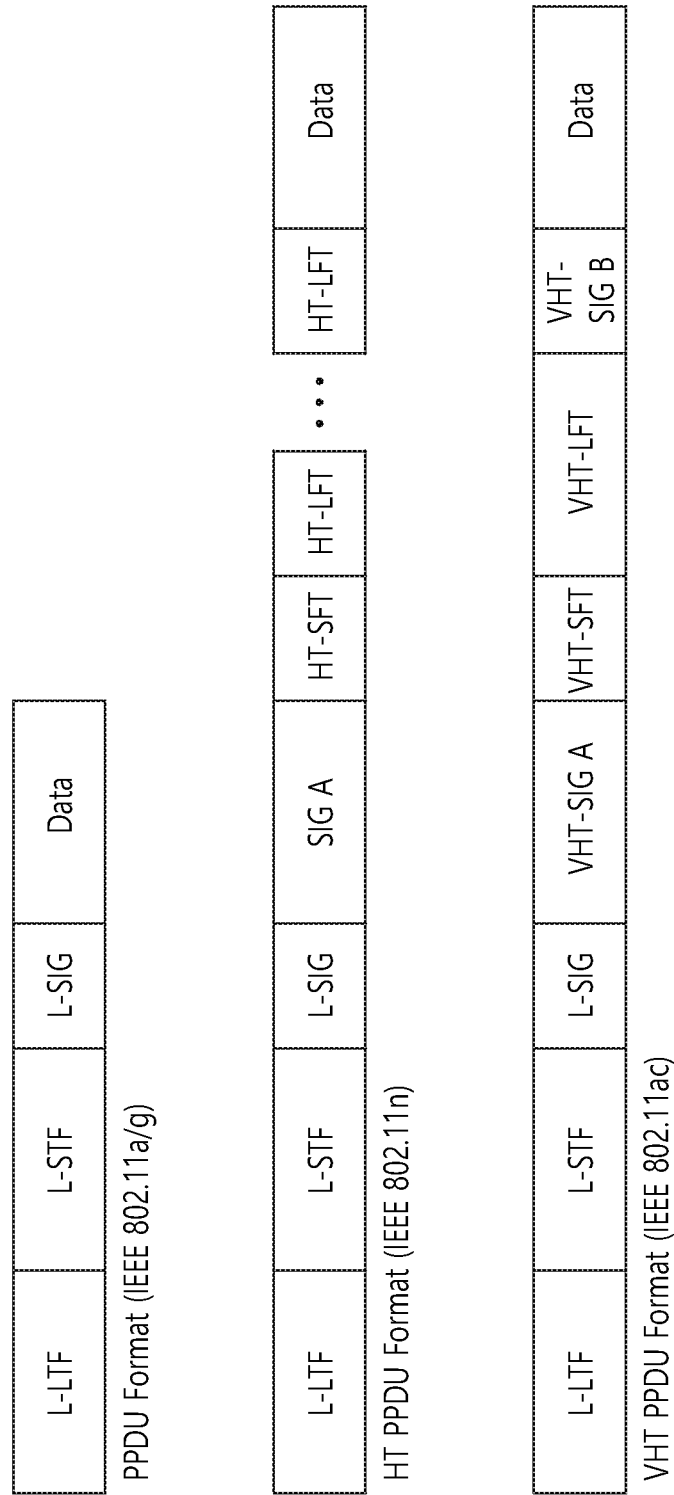
FIG. 2 is a diagram illustrating an example of a physical layer protocol data unit (PPDU) used in an institute of electronic and electronics engineers (IEEE) standard.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
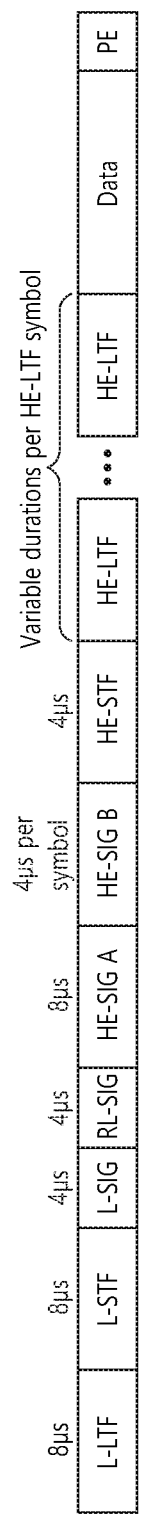
FIG. 3 is a diagram illustrating an example of a high efficiency (HE) PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
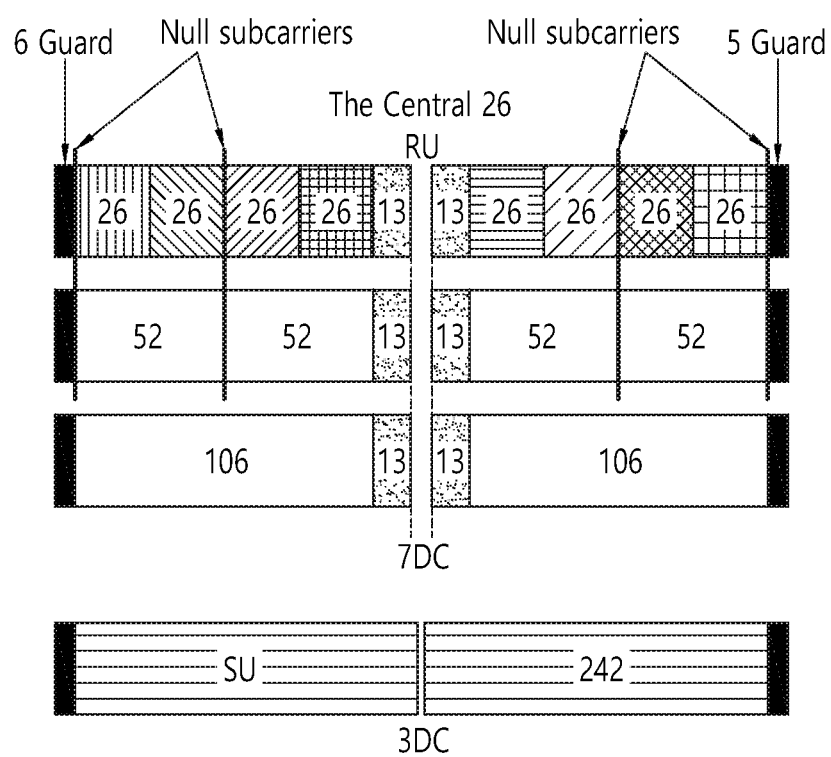
FIG. 4 is a diagram illustrating a layout of resource unit (RU) used in a 20 MHz band.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated with respect to the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
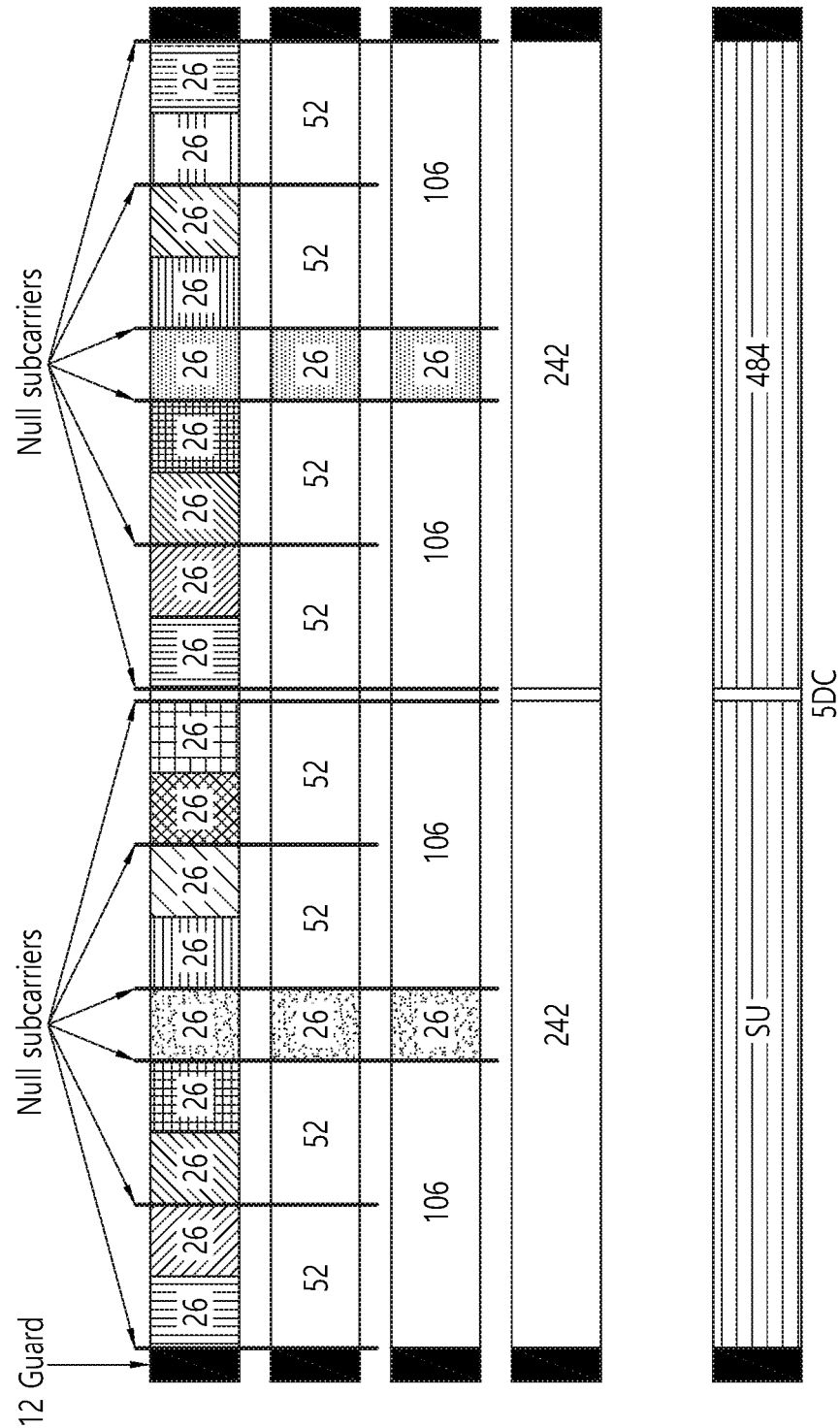
FIG. 5 is a diagram illustrating a layout of RU used in a 40 MHz band.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
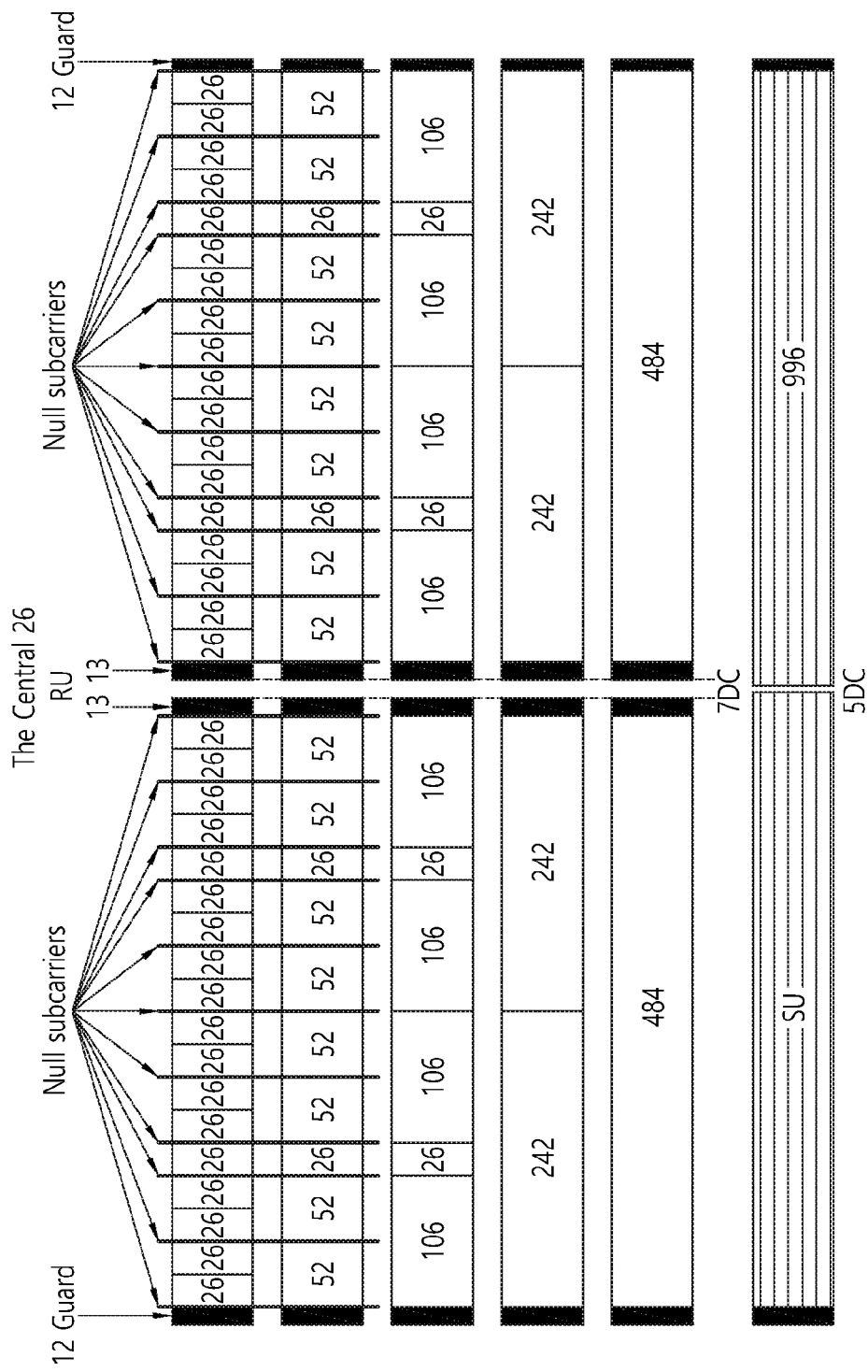
FIG. 6 is a diagram illustrating a layout of RU used in an 80 MHz band.

FIG. 6 is a diagram illustrating a layout of resource units (RUs) used in a band of 80 MHz.

Figure 26:
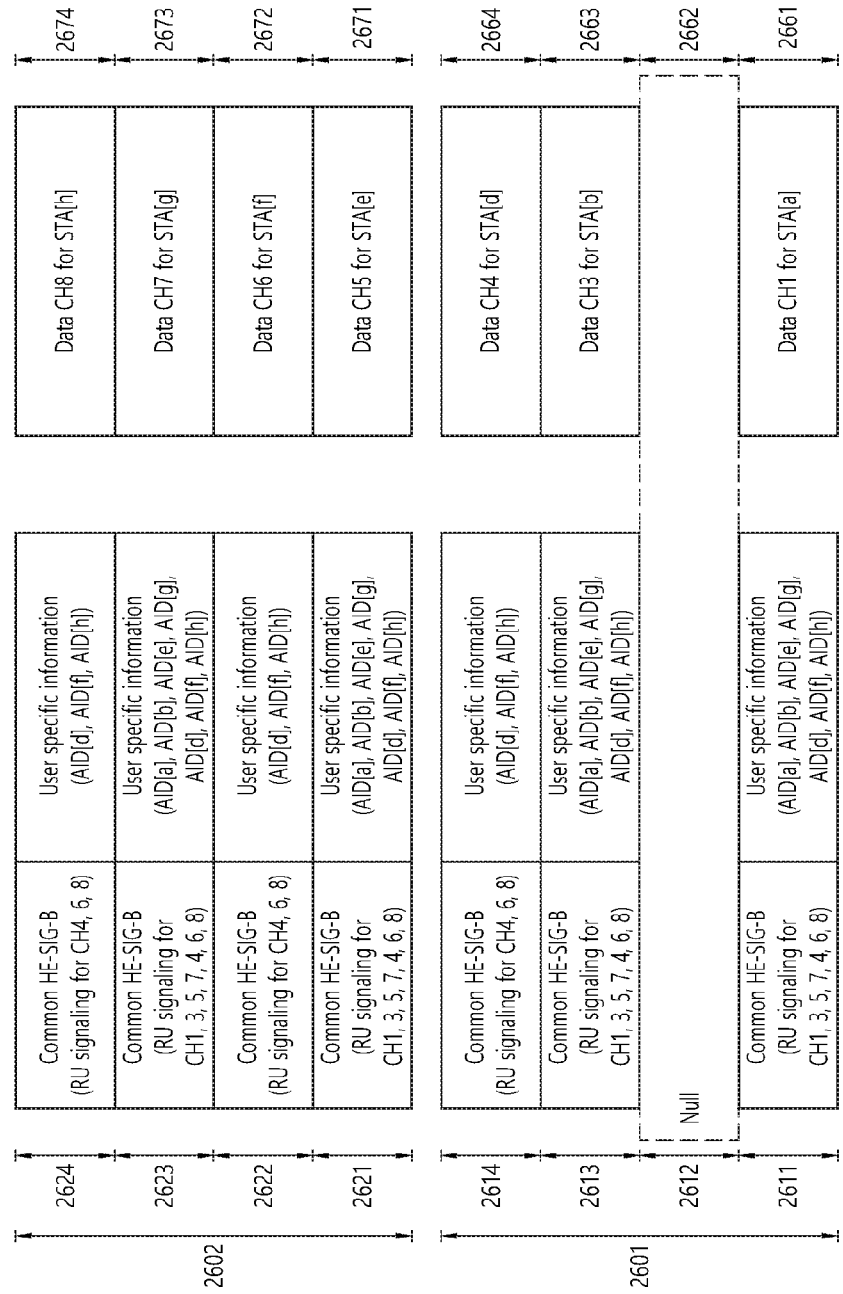
FIG. 26 is an example of applying a scheme of FIG. 25 to a 160 MHz band.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Meanwhile, the detailed number of RUs may be modified similarly to one example of each of FIG. 4 or 5.

Figure 7:
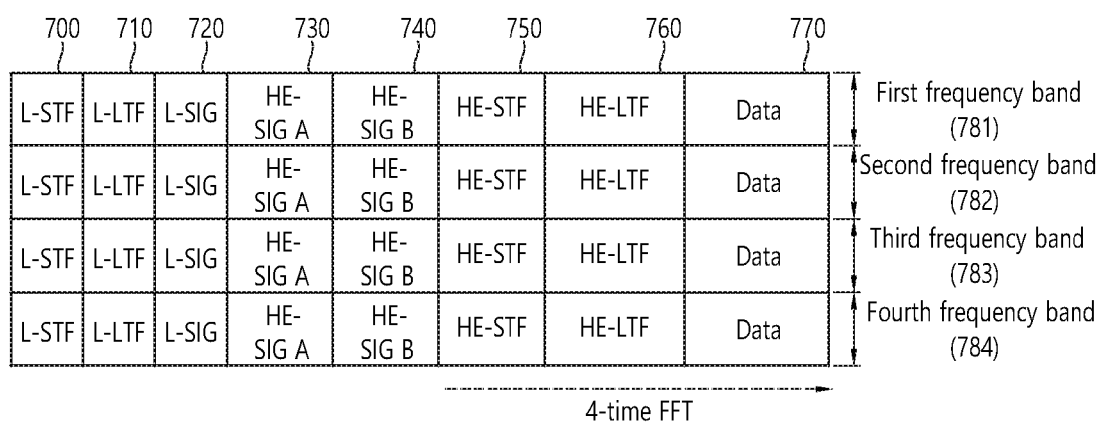
FIG. 7 is a diagram illustrating another example of an HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

Figure 8:
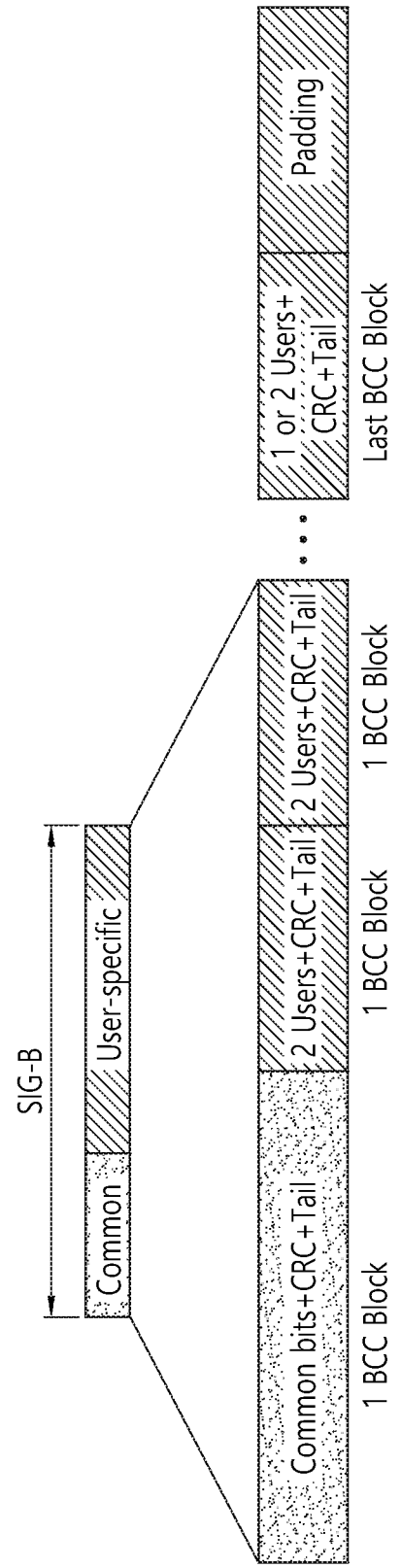
FIG. 8 is a block diagram illustrating one example of HE-SIG-B according to the present embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term. Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
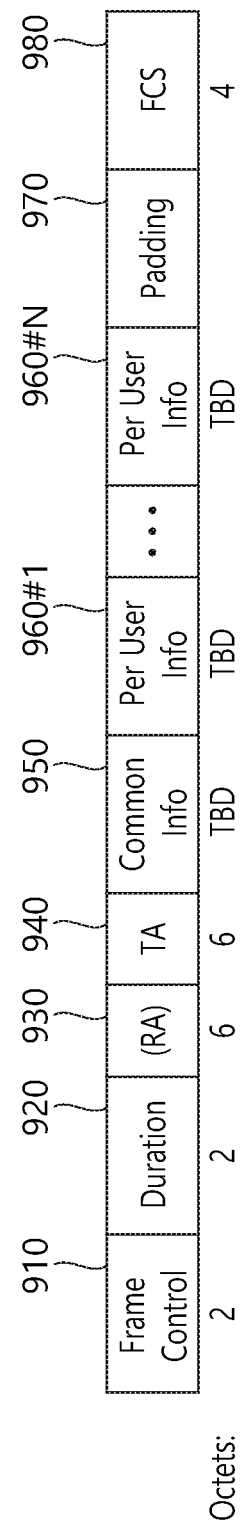
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

In addition, the RA field 930 may include address information of the receiving STA of a corresponding trigger frame, and may be optionally omitted. The TA field 940 includes address information of an STA (e.g., AP) for transmitting the trigger frame, and the common information field 950 includes common control information applied to the receiving STA for receiving the trigger frame. For example, information for controlling the content of a field indicating a length of an L-SIG field of an uplink PPDU transmitted in response to the trigger frame or an SIG-A (i.e., HE SIG-A field) of the uplink PPDU transmitted in response to the trigger frame may be included. Further, information regarding a length of a CP of the uplink PPDU transmitted in response to the trigger frame or information regarding a length of an LTF field may be included as common control information.

In addition, per user information fields 960#1 to 960#N corresponding to the number of receiving STAs for receiving the trigger frame of FIG. 9 are preferably included. The per user information field may be called an "RU allocation field".

In addition, the trigger frame of FIG. 9 may include a padding field 970 and a frame check sequence field 980.

Each of the per user information fields 960#1 to 960#N shown in FIG. 9 preferably includes a plurality of sub-fields.

Figure 10:
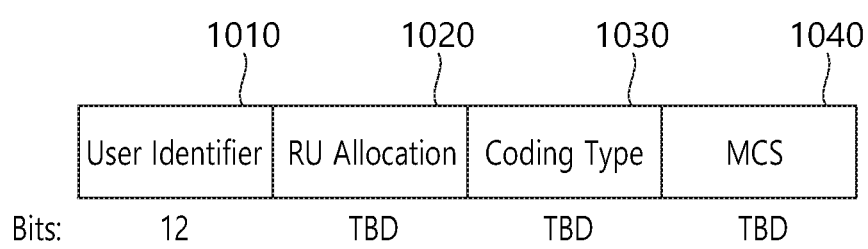
FIG. 10 illustrates an example of a sub-field included in a per user information field.

FIG. 10 illustrates an example of a sub-field included in a per user information field. Some parts of the sub-field of FIG. 10 may be omitted, and extra sub-fields may be added. Further, a length of each of the sub-fields shown herein may change.

A user identifier field 1010 of FIG. 10 indicates an identifier of an STA (i.e., a receiving STA) corresponding to per user information. An example of the identifier may be all or some parts of an AID.

In addition, an RU allocation field 1020 may be included. That is, if a receiving STA identified by the user identifier field 1010 transmits an uplink PPDU in response to the trigger frame of FIG. 9, the uplink PPDU is transmitted through an RU indicated by the RU allocation field 1020. In this case, the RU indicated by the RU allocation field 1020 preferably indicates the RU shown in FIG. 4, FIG. 5, and FIG. 6. A configuration of the RU allocation field 1020 is described below in detail.

The sub-field of FIG. 10 may include a coding type field 1030. The coding type field 1030 may indicate a coding type of an uplink PPDU transmitted in response to the trigger frame of FIG. 9. For example, if BCC coding is applied to the uplink PPDU, the coding type field 1030 may be set to '1', and if LDPC coding is applied, the coding type field 1030 may be set to '0'.

In addition, the sub-field of FIG. 10 may include an MCS field 1040. The MCS field 1040 may indicate an MCS scheme applied to the uplink PPDU transmitted in response to the trigger frame of FIG. 9. For example, if BCC coding is applied to the uplink PPDU, the coding type field 1030 may be set to '1', and if LDPC coding is applied, the coding type field 1030 may be set to '0'.

Hereinafter, the present specification proposes an example of improving a control field included in a PPDU. The control field improved by the present specification includes a first control field including control information required to interpret the PPDU and a second control field including control information for demodulating a data field of the PPDU. The first and second control fields may be various fields. For example, the first control field may be the HE-SIG-A 730 shown in FIG. 7, and the second control field may be the HE-SIG-B 740 shown in FIG. 7 and FIG. 8.

Hereinafter, an example of improving the first and second control fields is described in detail.

The following example proposes a control identifier inserted to the first control field or the second control field. The control identifier may have various sizes, and for example, may be implemented as 1-bit information.

If 20 MHz transmission is performed for example, the control identifier (e.g., 1-bit identifier) may indicate whether a 242-RU is allocated. An RU having various sizes may be used as shown in FIG. 4 to FIG. 6. The RU may be classified roughly into two types of RUs. For example, all RUs shown in FIG. 4 to FIG. 6 may be classified into an 26-type RU and a 242-type RU. For example, the 26-type RU may include a 26-RU, a 52-RU, and a 106-RU, and the 242-type RU may include a 242-RU, a 484-RU, and an RU having a larger size than the previous one.

The control identifier (e.g., 1-bit identifier) may indicate that the 242-type RU is used. That is, it may indicate that the 242-RU is included or the 484-RU or a 996-RU is included. If a transmission frequency band at which a PPDU is transmitted is a 20 MHz band, the 242-RU is a single RU corresponding to a full bandwidth of the transmission frequency band (i.e., 20 MHz). Accordingly, the control identifier (e.g., 1-bit identifier) may indicate whether the single RU corresponding to the full bandwidth of the transmission frequency band is allocated.

For example, if the transmission frequency band is a 40 MHz band, the control identifier (e.g., 1-bit identifier) may indicate whether a single RU corresponding to a full bandwidth (i.e., 40 MHz band) of the transmission frequency band is allocated. That is, whether the 484-RU is allocated for 40 MHz transmission may be indicated.

For example, if the transmission frequency band is an 80 MHz band, the control identifier (e.g., 1-bit identifier) may indicate whether a single RU corresponding to a full bandwidth (e.g., 80 MHz band) of the transmission frequency band is allocated. That is, whether the 996-RU is allocated for 80 MHz transmission may be indicated.

Various technical advantages can be achieved through the control identifier (e.g., 1-bit identifier).

First, through the control identifier (e.g., 1-bit identifier), it is possible to omit allocation information of the RU if a single RU corresponding to a full bandwidth of a transmission frequency band is allocated. That is, since only one RU is allocated to the full bandwidth of the transmission frequency band instead of a plurality of RUs, it is possible to omit the allocation information of the RU.

In addition, it can also be utilized as signaling for full bandwidth MU-MIMO. For example, if a single RU is allocated across a full bandwidth of the transmission frequency band, multiple users may be allocated to the single RU. That is, although a signal for each user is not divided in time and space, signals for several users may be multiplexed to the same single RU by using other schemes (e.g., spatial multiplexing). Accordingly, the control identifier (e.g., 1-bit identifier) may also be used to indicate whether to use the aforementioned full bandwidth MU-MIMO.

Figure 11:
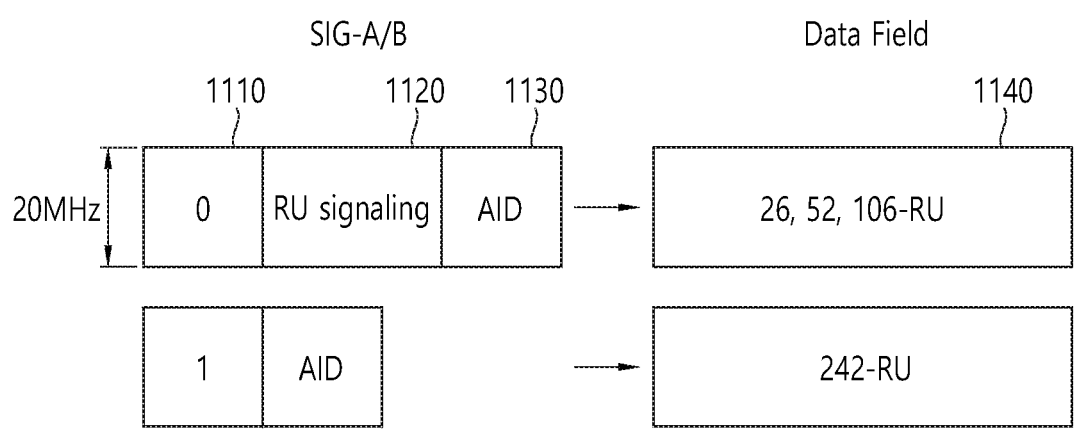
FIG. 11 is a block diagram illustrating an example of a control field and data field configured according to the present embodiment.

FIG. 11 is a block diagram illustrating an example of a control field and data field configured according to the present embodiment.

A left block of FIG. 11 indicates information included in a first and/or second control field of a PPDU, and a right block of FIG. 11 indicates information included in a data field of the PPDU. The PPDU related to FIG. 11 may be a PPDU for a multi-user, that is, a plurality of receiving devices. More specifically, a field configuration may vary for the multi-user and the single user, and the example of FIG. 11 may be a PPDU for the multi-user.

Although it is shown that the example of FIG. 11 is used for 20 MHz transmission, a bandwidth of a transmission frequency band is not limited thereto, and thus the present invention is also applicable to 40 MHz, 80 MHz, and 160 MHz transmission.

As shown in the left block of FIG. 11, the control identifier (e.g., 1-bit identifier) may be included in the first and/or second control fields. For example, if a control identifier 1110 is included in the first control field, information regarding allocation information 1120 for an RU may be included in the second control field. Further, identification information 1130 of a receiving device for receiving the PPDU of FIG. 11 may be included in the second control field. The identification information 1130 of the receiving device may indicate to which receiving device a data field 1140 corresponding to the second control field is allocated, and for example, may be implemented with an AID.

As shown in FIG. 11, the allocation information for the RU may be omitted in the second control field according to the control identifier (e.g., 1-bit identifier). For example, if the control identifier is set to "1", the allocation information 1120 for the RU may be omitted in the second control field, and the identification information 1130 of the receiving device may be included. Further, if the control identifier is set to "0", the allocation information 1120 for the RU may be included in the second control field, and the identification information 1130 of the receiving device may also be included.

The allocation information 1120 for the RU of FIG. 11 may be included in the common field of the SIG-B shown in FIG. 8, and the identification information 1130 of FIG. 11 may be included in the user-specific field of the SIG-B shown in FIG. 8.

In addition, referring to FIG. 11, common information such as RU signaling information, stream allocation related information, or the like for a user may be included in the common field of the SIG-B, and common information for all users receiving the PPDU of FIG. 11 may be included. If the aforementioned allocation information 1120 for the RU is omitted, there is a technical advantage in that an overhead is decreased.

According to another example, in case of using 20 MHz transmission, since 242-RU allocation may be regarded as single user (SU) transmission, the aforementioned control identifier (e.g., 1-bit identifier) may be omitted. In this case, a different operation may be performed according to a first control field (e.g., HE-SIG-A) SU/MU identification field. That is, if the SU/MU identification field included in the first control field indicates MU transmission, an example is possible in which the control identifier is omitted and only a 26-type RU is allocated.

Hereinafter, another example of the present embodiment is described.

Figure 12:
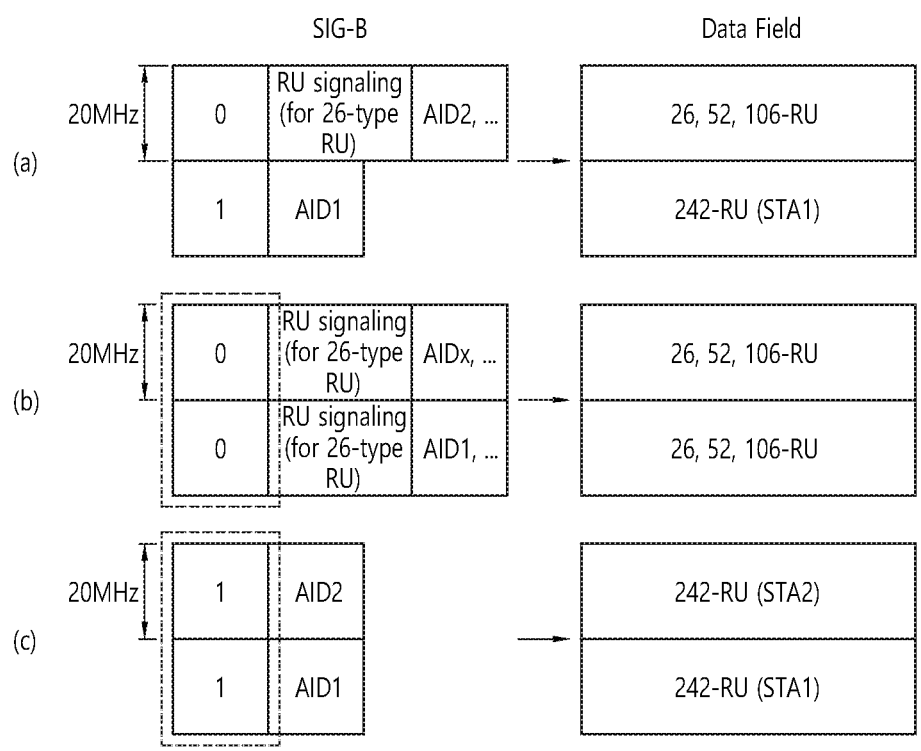
FIG. 12 illustrates an example of the present embodiment for 40 MHz transmission.

FIG. 12 illustrates an example of the present embodiment for 40 MHz transmission.

A left block of FIG. 12 indicates information corresponding to a first and/or second control field. For convenience, it is described hereinafter that the left block of FIG. 12 corresponds to the second control field (i.e., SIG-B), and a right block of FIG. 12 corresponds to a data field of a PPDU.

As illustrated, each control field and the data field correspond to a 20 MHz band.

In the example of FIG. 12, if the aforementioned control identifier (e.g., 1-bit identifier) is set to "1", allocation information for an RU may be omitted. In the example of FIG. 12, the control identifier (e.g., 1-bit identifier) may indicate whether a 242-RU (or 242-type RU) is used.

Referring to FIG. 12, the control identifier is included in a front portion of a common field of the SIG-B. In the example of FIG. 12, the control identifier may be called a "242 unit bitmap". The same advantage as in FIG. 11 can be achieved in a sense that RU allocation information can be omitted according to the "242 unit bitmap", and also an overhead decrease effect can be achieved.

If only the 242-RU is allocated in all 40 MHz channels, the "242 unit bitmap" may be set to "1". Referring to the subfigure (b) of FIG. 12, if only the 26-type RU is allocated in the 40 MHz channel, the "242 unit bitmap" may be set to "00". Referring to the subfigure (c) of FIG. 12, if only the 242-RU is allocated in all 40 MHz channels, the "242 unit bitmap" may be set to "11". Since a last symbol of an SIG-B part needs to be aligned with a longest SIGB symbol of 20 MHz channels, an overhead decrease effect is small when RU allocation information is omitted only in any one 20 MHz channel. Accordingly, if only the 242-RU is allocated in all 20 MHz channels, an example is also possible in which the "242 unit bitmap" is set to "1".

Hereinafter, another example for the aforementioned control identifier (e.g., 1-bit identifier) is proposed. More specifically, it is proposed an example in which the aforementioned control identifier is classified into two identifiers. That is, the proposed identifier includes a first identifier indicating whether a 242-type RU is allocated for each 20 MHz channel and a second identifier indicating whether a 484-RU (or a different sized 242 type RU) is allocated in a corresponding 20 MHz.

Further, an improved example is proposed in regards to a frequency mapping relation between the second control field (i.e., SIG-B) and the data field. Although an additional example for the frequency mapping between the second control field (i.e., SIG-B) and the data field is also applicable to the aforementioned example (i.e., the example of FIG. 11 or FIG. 12), the following description is based on the example of FIG. 13 for convenience of explanation.

Figure 13:
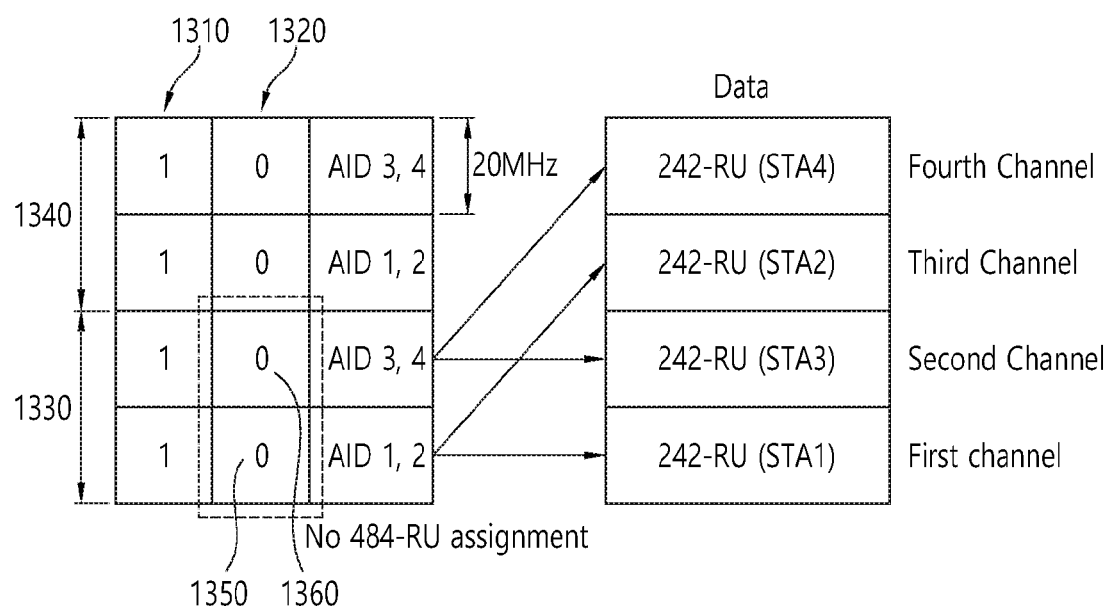
FIG. 13 illustrates an example in which the present specification is applied to 80 MHz transmission.

FIG. 13 illustrates an example in which the present specification is applied to 80 MHz transmission.

In the example of FIG. 13, a first identifier 1310 is configured for each 20 MHz channel. That is, four 1-bit identifiers may be inserted to indicate whether a 242-type RU is allocated for each 20 MHz. In this case, since a 484-RU may be allocated in an 80 MHz band, an additional identifier indicating whether a specific 20 MHz channel (i.e., 242 chunk) is used for the 242-RU or is used for the 484-RU, that is, the aforementioned second identifier 1320, may be additionally included. If both of the first and second identifiers are used, total 8-bit information may be used for the first/second identifiers in the 80 MHz band.

The first and second identifiers may also be expressed as a "242 unit bitmap" and a "484 unit assignment indication field". The first and second identifiers may also be implemented as a 2-bit field. For example, if a second identifier 1350 corresponding to a first channel and a second identifier 1360 corresponding to a second channel are set to "00", this means that the 484-RU is not allocated in a corresponding PPDU. For example, if the first and second identifiers are set to "1" and "0", it may indicate that only the 242-RU is allocated.

The example of FIG. 13 relates to the first identifier 1310 and second identifier 1320 as illustrated. However, an example for a frequency mapping relation between the second control field (i.e., SIG-B) and the data field may be additionally applied.

More specifically, the second control field (i.e., SIG-B) may be configured separately for each 20 MHz channel. However, the present specification proposes an example of independently configuring lower two 20 MHz channels 1330 and upper two 20 MHz channels 1340. More specifically, an example is proposed in which the SIG-B corresponding to the upper or lower two 20 MHZ channels is configured and is then duplicated to be used for the remaining two 20 MHz channels.

All or some parts of the field proposed in the present specification, for example, the SIG-B, are preferably configured according to the aforementioned duplication method. For example, if four 20 MHz channels shown in the example of FIG. 13 are classified into first to fourth channels in an orderly manner from bottom to top, an SIG-B included in the first and second channels may have the same content as an SIG-B included in the third and fourth channels. In this case, it is assumed that the first channel has a lowest frequency index, and the second to fourth channels are located in an ascending order. Further, as illustrated, an SIG-B corresponding to the second channel first displays an AID3 corresponding to an STA3, and thereafter displays an AID4 corresponding to an STA4. Accordingly, the SIG-B corresponding to the second channel may allocate the STA3 to a data field corresponding to the second channel, and may allocate the STA4 to a data field corresponding to the fourth channel. That is, the SIG-B corresponding to the second channel may first indicate STA identification information regarding the data field corresponding to the second channel, and thereafter may indicate STA identification information regarding the data field corresponding to the fourth channel.

In addition, referring to FIG. 13, the SIG-B corresponding to the first channel may indicate the data field corresponding to the first channel and indicate an STA (i.e., STA1) allocated to the data field corresponding to the first channel, or may indicate the data field corresponding to the third channel and indicate an STA (i.e., STA2) allocated to the data field corresponding to the third channel. That is, the SIG-B included in the first channel may indicate the STA identification information regarding the data field corresponding to the first channel, and may indicate the STA identification information regarding the data field corresponding to the third channel.

Figure 14:
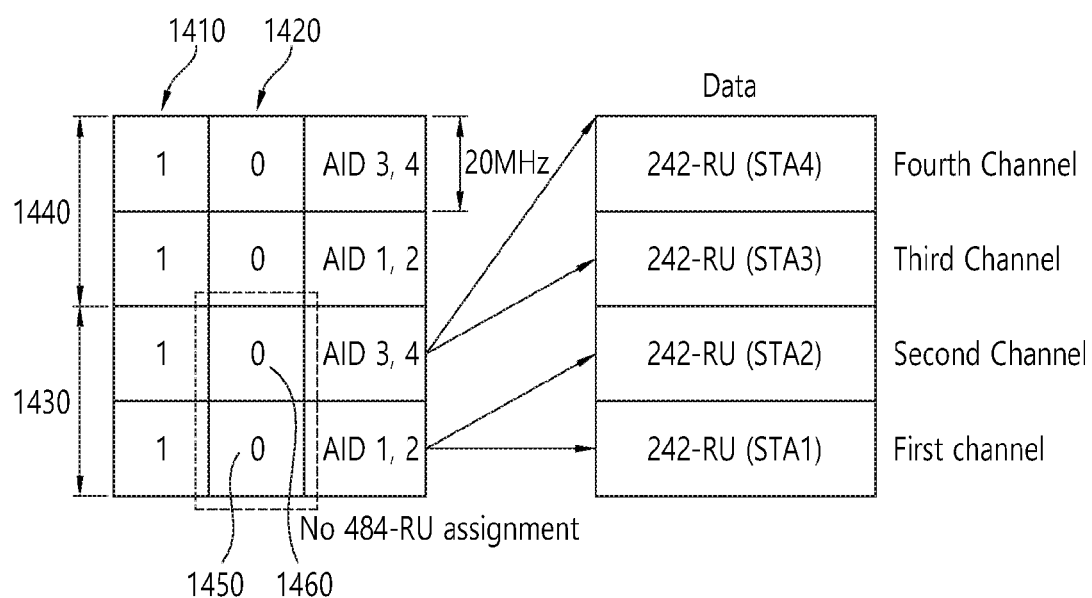
FIG. 14 illustrates an example of modifying a control signal according to the present specification.

FIG. 14 illustrates another example according to the present specification.

Referring to FIG. 14, a first identifier 1410 is included in a head portion of an SIG-B field corresponding to each 20 MHz, followed by a second identifier 1420.

The first/second identifiers of FIG. 14 may be used in the same manner as the first/second identifiers of FIG. 13. Further, the example of FIG. 14 may have a predetermined mapping relation between the SIG-B and the data field similarly to the example of FIG. 13. However, the example of FIG. 14 differs from the example of FIG. 13 in a sense that the SIG-B corresponding to the first channel is mapped to the data field corresponding to the first/second channels, and the SIG-B corresponding to the second channel is mapped to the data field corresponding to the third/fourth channels.

Figure 15:
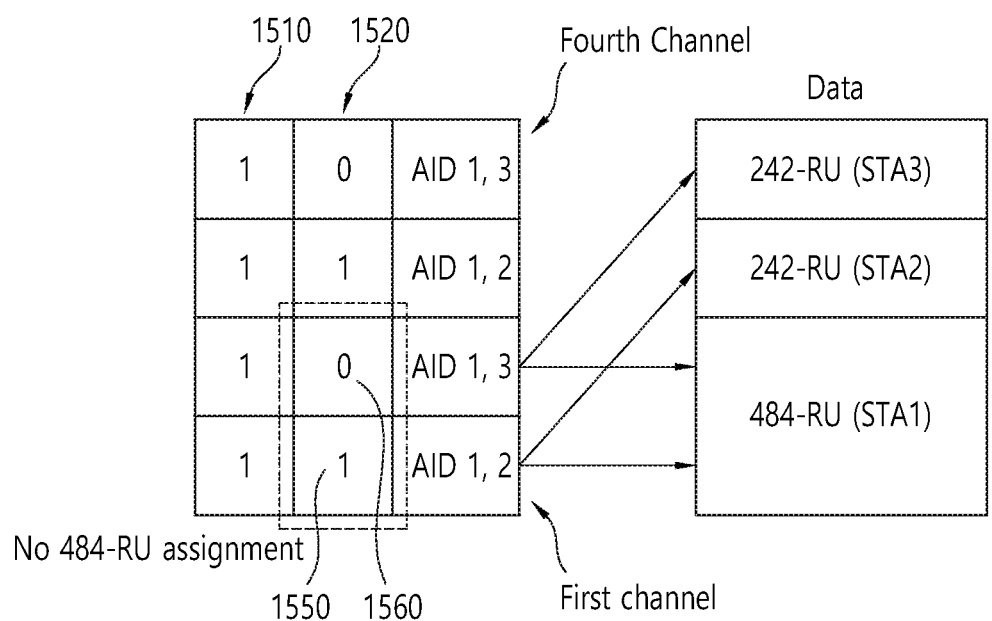
FIG. 15 illustrates an additional example of modifying a control signal according to the present specification.

FIG. 15 illustrates another example according to the present specification.

Referring to FIG. 15, a first identifier 1510 is included in a head portion of an SIG-B field corresponding to each 20 MHz, followed by a second identifier 1520. The first/second identifiers according to the example of FIG. 15 may correspond to the first/second identifiers of FIG. 13 and/or FIG. 14.

As shown in FIG. 15, all or some parts of information of the SIG-B field corresponding to first/second channels may be duplicated to third/fourth channels. That is, as shown in FIG. 15, the SIG-B field corresponding to the first/second channels indicates {AID1, 2} and {AID1, 3}. The SIG-B field corresponding to the third/fourth channels may also indicate {AID1, 2} and {AID1, 3}.

Referring to FIG. 15, a second identifier 1550 corresponding to the first channel indicates "1", and a second identifier 1560 corresponding to the second channel indicates "0". This indicates that a 484-RU is allocated to the first/second channels, and the 484-RU is not allocated to the third/fourth channels. Since all of the first identifiers 1501 are set to 1 in the example of FIG. 15, eventually, in the data field of FIG. 15, a 484-RU is allocated to the first/second channels, a 242-RU is allocated to the third channel, and 282-RU is also allocated to the fourth channel.

Extra other features of FIG. 15 are the same as those in the example of FIG. 13 and FIG. 14.

Figure 16:
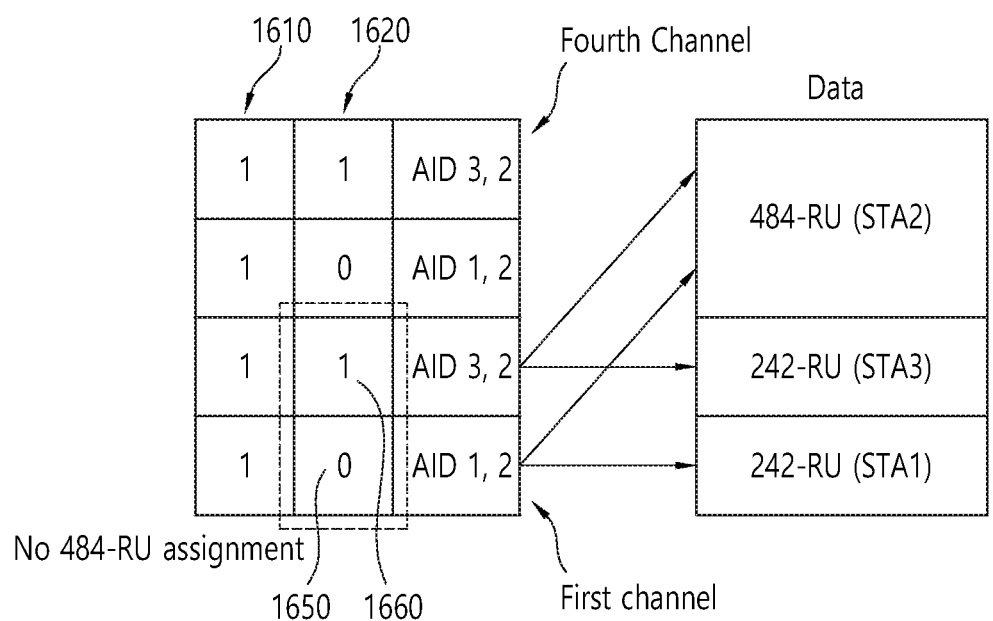
FIG. 16 illustrates an example of modifying a control signal and frequency mapping relation according to the present specification.

FIG. 16 illustrates another example according to the present specification.

Referring to FIG. 16, a first identifier 1610 is included in a head portion of an SIG-B field corresponding to each 20 MHz, followed by a second identifier 1620.

As shown in FIG. 16, all or some parts of information of the SIG-B field corresponding to first/second channels may be duplicated to third/fourth channels. That is, as shown in FIG. 16, the SIG-B field corresponding to the first/second channels indicates {AID1, 2} and {AID3, 2}. The SIG-B field corresponding to the third/fourth channels may also indicate {AID1, 2} and {AID3, 2}.

Referring to FIG. 16, a second identifier 1650 corresponding to the first channel indicates "0", and a second identifier 1660 corresponding to the second channel indicates "1". This indicates that a 484-RU is not allocated to the first/second channels, and the 484-RU is allocated to the third/fourth channels. Since all of the first identifiers 1601 are set to 1 in the example of FIG. 16, eventually, in the data field of FIG. 16, a 242-RU is allocated to the first/second channels, and the 484-RU is allocated to the third/fourth channels.

Extra other features of FIG. 16 are the same as those in the example of FIG. 13 to FIG. 15.

Figure 17:
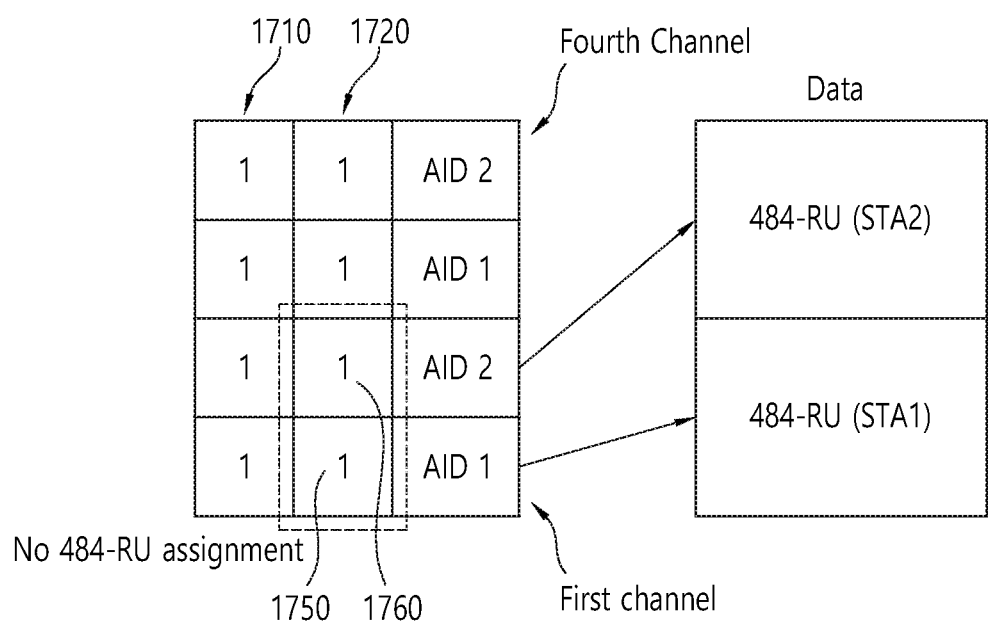
FIG. 17 illustrates an example of modifying a control signal and frequency mapping relation according to the present specification.

FIG. 17 illustrates another example according to the present specification. Referring to FIG. 17, a first identifier 1710 is included in a head portion of an SIG-B field corresponding to each 20 MHz, followed by a second identifier 1720.

As shown in FIG. 17, all or some parts of information of the SIG-B field corresponding to first/second channels may be duplicated to third/fourth channels. That is, as shown in FIG. 17, the SIG-B field corresponding to the first/second channels indicates {AID1} and {AID2}. The SIG-B field corresponding to the third/fourth channels may also indicate {AID1} and {AID2}.

Referring to FIG. 17, a second identifier 1750 corresponding to the first channel indicates "1", and a second identifier 1760 corresponding to the second channel indicates "1". This indicates that a 484-RU is not allocated to the first/second channels, and the 484-RU is allocated to the third/fourth channels.

Extra other features of FIG. 17 are the same as those in the example of FIG. 13 to FIG. 16.

Figure 18:
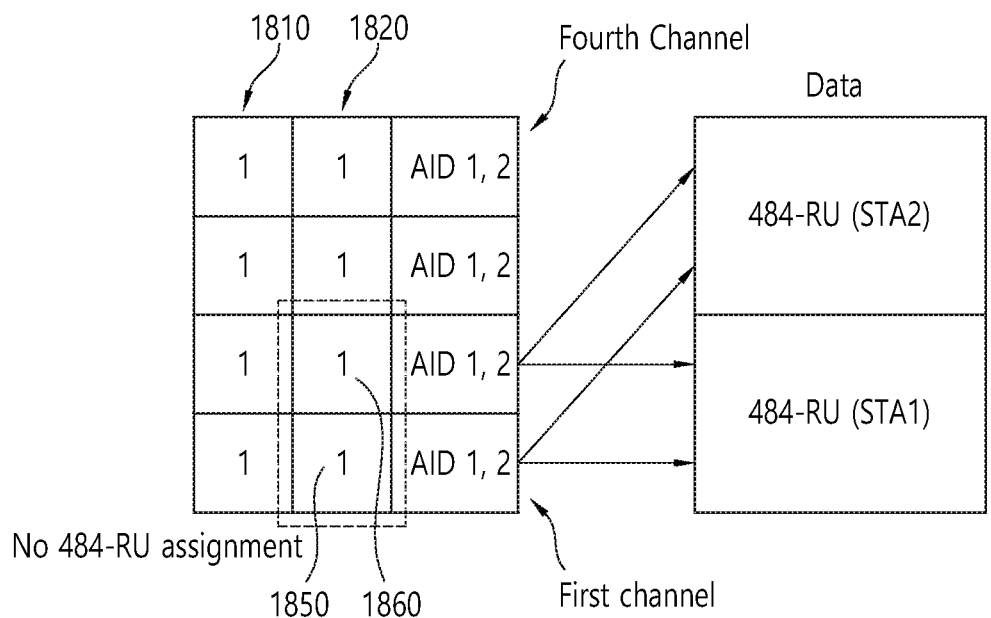
FIG. 18 illustrates an additional example of a control signal and frequency mapping relation according to the present specification.

FIG. 18 illustrates another example according to the present specification.

Referring to FIG. 18, a first identifier 1810 is included in a head portion of an SIG-B field corresponding to each 20 MHz, followed by a second identifier 1820.

As shown in FIG. 18, all or some parts of information of the SIG-B field corresponding to first/second channels may be duplicated to third/fourth channels. That is, as shown in FIG. 18, the SIG-B field corresponding to the first/second channels indicates {AID1, 2} and {AID1, 2}. The SIG-B field corresponding to the third/fourth channels may also indicate {AID1, 2} and {AID1, 2}.

Referring to FIG. 18, a second identifier 1850 corresponding to the first channel indicates "1", and a second identifier 1860 corresponding to the second channel indicates "1". This indicates that a 484-RU is not allocated to the first/second channels, and the 484-RU is allocated to the third/fourth channels.

Extra other features of FIG. 18 are the same as those in the example of FIG. 13 to FIG. 17.

Figure 19:
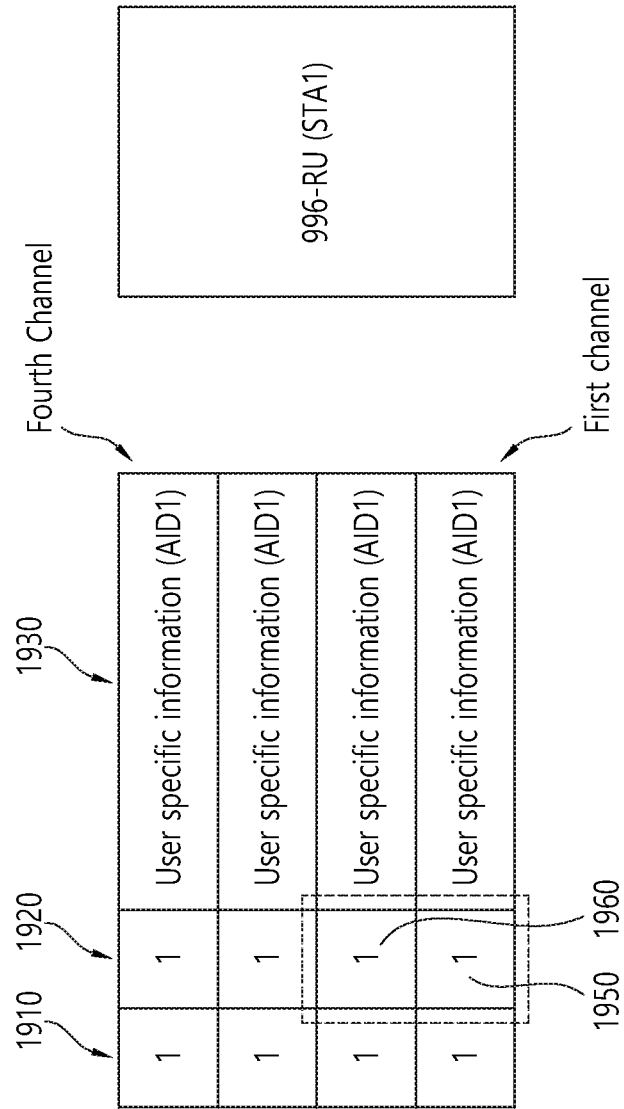
FIG. 19 illustrates an example of signaling for distinguishing a 484-RU and a 996-RU.

FIG. 19 illustrates another example according to the present specification.

The example of FIG. 13 to FIG. 18 is an example of explicitly indicating a 242-RU and a 484-RU by using a first identifier (or a 242-unit bitmap) and a second identifier (or a 484-unit assignment indication field). In this case, how to distinguish the 484-RU and the 996-RU may be problematic.

The example of FIG. 19 uses the number of receiving STAs included in a user-specific field of a second control field (e.g., SIG-B) to explicitly distinguish the 484-RU and the 996-RU. For example, when a first identifier 1910 and a second identifier 1920 are both set to "1" and the number of receiving STAs indicated in the user-specific field (i.e., user-specific information) is "1", it indicates that the 996-RU is used.

As shown in FIG. 19, since the number of receiving STAs included in the user-specific field 1930 is "1", it indicates that the 996-RU is used. That is, it may indicate that an STA1 corresponding to an AID1 is allocated to the 996-RU. The example of FIG. 19 is identical to the example of FIG. 18 in a sense that a second identifier 1950 corresponding to a first channel indicates "1" and a second identifier 1960 corresponding to a second channel is "1". However, since the number of receiving STAs is "1", it may indicate that the 996-RU is used.

Extra other features of FIG. 19 are the same as those in the example of FIG. 13 to FIG. 18.

Figure 20:
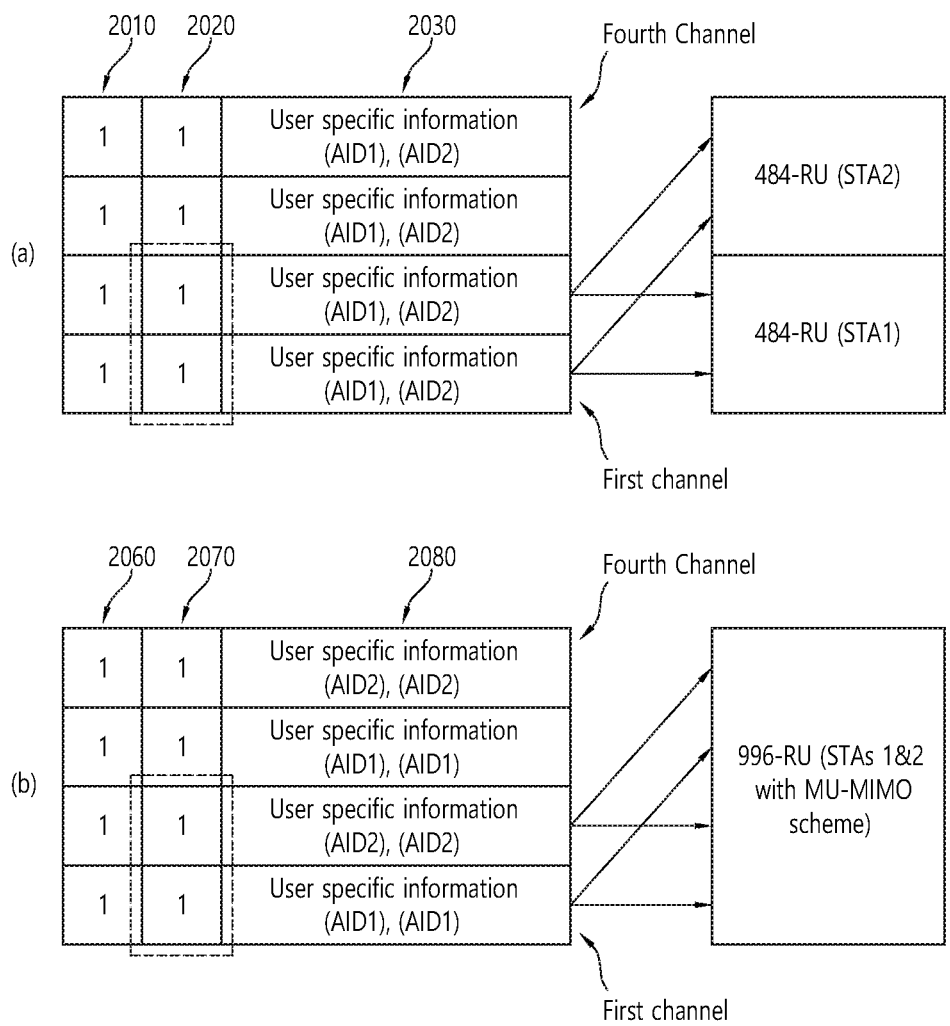
FIG. 20 illustrates an additional example of signaling for distinguishing a 484-RU and a 996-RU.

FIG. 20 illustrates another example according to the present specification.

The example of FIG. 20 is similar to the example of FIG. 19, but relates to a case where the number of receiving STAs included in the user-specific field 1930 is set to "2".

Specifically, as shown in a sub-figure (a) of FIG. 20, in a case where a first identifier 2010 and a second identifier 2020 are both set to "1", if the number of receiving STAs indicated by a user-specific field 2030 is 2, it indicates that a 484-RU is used. That is, since an AID1 and an AID2 are indicated by the user-specific field 2030 as illustrated, the 484-RU is allocated to a data field corresponding to a first/second channel, and an STA1 (AID1) is allocated to the 484-RU. In addition, the 484-RU is also allocated to a data field corresponding to a third/fourth channel, and an STA2 (AID2) is allocated to the 484-RU. More specifically, a first AID of a first user-specific field (i.e., a user-specific field corresponding to the first channel) may be mapped to a data field corresponding to the first channel, and a second AID may be mapped to a data field corresponding to the third channel. Accordingly, the first AID (i.e., AID1) is allocated to the 484-RU corresponding to the first channel and the second AID (i.e., AID2) is allocated to the 484-RU corresponding to the third channel. Likewise, a first AID of the second user-specific field (i.e., a user-specific field corresponding to the second channel) may be mapped to a data field corresponding to the second channel, and a second AID may be mapped to a data field corresponding to the fourth channel. Accordingly, the first AID (i.e., AID1) is allocated to the 484-RU corresponding to the second channel and the second AID (i.e., AID2) is allocated to the 484-RU corresponding to the fourth channel.

However, even if the first identifier 2010 and the second identifier 2020 are both set to "1" and the number of receiving STAs indicated by the user-specific field 2030 is 2 or higher, it may indicate that a MU-MIMO scheme is applied to a 996-RU when receiving STAs indicated by the user-specific field 2030 are duplicated. Specifically, as shown in a sub-figure (b) of FIG. 20, even if first/second identifiers 2060 and 2070 are both set to "1" and two receiving STAs are specified for each of the four user-specific fields 2030, it may indicate that the 996-RU is used and a MU-MIMO scheme is applied, when a duplicated STA (e.g., {STA1}, {STA1}) is indicated in each of the user-specific fields 2030. That is, it may indicate that the AID1 is allocated to an RU corresponding to the first channel and the third channel, and the AID2 is allocated to an RU corresponding to the second channel and the fourth channel. In this case, since the 484-RU consists of two consecutive channels, it may indicate that corresponding allocation is applied to not the 484-RU but the 996-RU together with the MU-MIMO scheme.

More specifically, since {AID1, AID1} is indicated by the user-specific field corresponding to the first channel, it may indicate that the STA1 is included in a receiving STA to be multiplexed to the 996-RU. In addition, since {AID2, AID2} is indicated by the user-specific field corresponding to the second channel, it may indicate that the STA2 is included in the receiving STA to be multiplexed to the 996-RU.

As a result, as shown in a sub-figure (b) of FIG. 20, it may indicate that the STA1 and the STA2 are multiplexed to the 996-RU corresponding to an 80 MHz band according to a MI-MIMO scheme.

Extra other features of FIG. 20 are the same as those in the example of FIG. 13 to FIG. 19.

Figure 21:
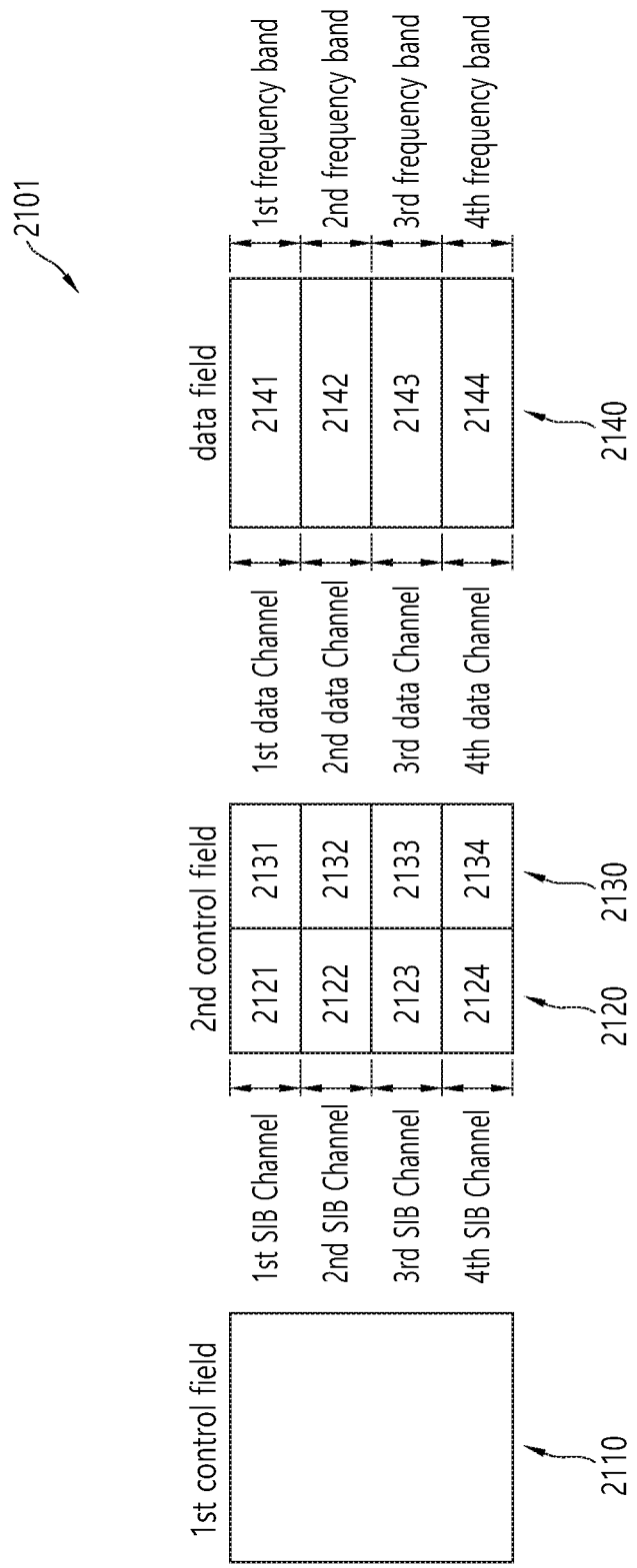
FIG. 21 illustrate a relation of SIG-A, SIG-B, and data fields according to the present embodiment.

FIG. 21 is a diagram illustrating a relation of SIG-A, SIG-B, and data fields according to the present embodiment. An example of FIG. 21 differs from other examples in that a first channel (or a first SIG-B channel, a first data channel, a first frequency band) is displayed at the top of the figure, and a fourth channel (or a fourth SIG-B channel, a fourth data channel, a fourth frequency band) is displayed at the bottom of the figure. However, there is no change in that a channel with a relatively low frequency index corresponds to the first channel, a channel with a relatively high frequency index corresponds to the fourth channel, and each channel is substantially continuous.

A PPDU 2101 of FIG. 21 may include all or some parts of the field shown in FIG. 7. More specifically, as illustrated, it may include a first control field 2110, second control fields 2120 and 2130, and a data field 2140. The first control field 2110 may correspond to the aforementioned SIG-A or HE-SIG-A, and the second control field 2120 may correspond to the aforementioned SIG-B or HE-SIG B.

The first control field 2110 may include the HE-SIG A 730 of FIG. 7 and a technical feature shown in FIG. 11 to FIG. 20. More specifically, the first control field 2110 may include control information for interpreting the PPDU 2101. For example, as described in the example of FIG. 7, the PPDU 2101 may include a sub-field indicating a transmission frequency band at which the PPDU 2101 is transmitted (i.e., indicating 20 MHz, 40 MHz, 80 MHz, 160 MHz, etc.).

Further, a control identifier (e.g., a first identifier and/or a second identifier) described in FIG. 11 to FIG. 20 may be included. More specifically, the first control field 2110 may include a 1-bit identifier indicating whether a single RU corresponding to a full bandwidth of the transmission frequency band is allocated. If the control identifier (e.g., 1-bit identifier) of the first control field 2110 is set to "1", it indicates that a single RU corresponding to the full bandwidth of the transmission frequency band is allocated. That is, if the transmission frequency band is a 20 MHz band, it indicates that a single 242-RU is allocated, and for example, if the transmission frequency band is an 80 MHz band, it indicates that a single 996-RU is allocated. Meanwhile, as described above, the 1-bit identifier has a technical advantage in that signaling for full bandwidth MU-MIMO is possible.

If the example of FIG. 21 is applied to 80 MHz transmission, the first control field 2110 may be included in the PPDU 2101 in such a manner of being generated in unit of 20 MHz and thereafter being duplicated on the basis of the transmission frequency band. That is, the first control field 2110 may be generated in unit of 20 MHz, and may be duplicated according to an 80 MHz band.

The second control field may correspond to the HE-SIG B field including the common field and user specific field shown in FIG. 8. That is, the second control field may include the common field 2120 and the user specific field 2130. As described above, common information such as RU allocation information for a user may be included in the common field 2120 of the SIG-B. For example, RU allocation information having a form of a look-up table including specific n-bit mapping information may be included. The RU allocation information may indicate arrangement or allocation information of an RU applied to the corresponding data field 2140. That is, a structure in which a plurality of RUs are arranged may be indicated as shown in FIG. 4 to FIG. 6. All STAs which have received the common field 2120 of the second control field may confirm a specific RU by which the corresponding data field 2140 is configured.

In summary, the second control field generally includes allocation information for a resource unit (RU) through the common field 2120. However, if a control identifier (e.g., 1-bit identifier) included in the first control field 2110 is set to "1", the allocation information for the RU is preferably omitted. That is, the common field 2120 may be omitted. Since only a single RU is used when the control identifier is set to "1", there is no need to configure allocation information for the RU, and thus the common field 2120 can be omitted. In other words, if the control identifier (e.g., 1-bit identifier) included in the first control field 2110 is set to "0", the common field 2120 of the second control field may include allocation information for the RU, and if the control identifier (e.g., 1-bit identifier) included in the first control field 2110 is set to "1", the common field 2120 of the second control field may not include the allocation information of the RU.

Meanwhile, the user-specific field 2130 of the second field may include identification information (e.g., AID) for the user STA as shown in FIG. 8.

The second control fields 2120 and 2130 are used to demodulate the data field 2140. In this case, the second control field and the data field 2140 may have a mapping relation as shown in FIG. 13 to FIG. 20.

For example, if the example of FIG. 21 relates to 80 MHz transmission, the second control field may correspond to the first to fourth SIG-B channels. That is, the channel may be divided into four 20 MHz channels. For example, a channel with a lowest frequency index may be the first channel, and a channel with a highest frequency index may be the fourth channel.

In this case, the content of second control fields 2121 and 2131 corresponding to the first SIG-B channel may be the same as the content of second control fields 2123 and 2133 corresponding to the third SIG-B channel. In other words, some parts of the second control field may be duplicated in the PPDU 2101. The duplication for the second control field may be implemented in various manners.

For convenience of explanation, four second control fields corresponding to the first to fourth SIG-B channels may be called first, second, third, and fourth signal fields. In this case, second signal fields 2122 and 2132 may be duplicated to construct fourth signal fields 2124 and 2134. That is, the content of the second control fields 2122 and 2132 corresponding to the second SIG-B channel may be the same as the content of the second control fields 2124 and 2134 corresponding to the fourth SIG-B channel.

When such a duplication is performed, the first signal fields 2121 and 2131 may correspond to a data field 2141 of the first data channel and a data field 2143 of the third data channel. Further, the second signal fields 2122 and 2132 may correspond to a data field 2142 of the second data channel and a data field 2144 of the fourth data channel.

In other words, the common field 2121 included in the first signal fields 2121 and 2131 may indicate allocation information for an RU applied to the data field 2141 of the first data channel and allocation information for an RU applied to the data field 2143 of the third data channel. In this case, the allocation information for the RU applied to the data field 2141 of the first data channel is first inserted in a form of one BCC block in the first signal fields 2121 and 2131, and thereafter one BCC block for the data field 2143 of the third data channel is inserted.

Further, the user specific field 2131 included in the first signal fields 2121 and 2131 may include identification information (e.g., AID) of an STA allocated to the data field 2141 of the first data channel and identification information (e.g., AID) of an STA allocated to the data field 2143 of the third data channel. In this case, the aforementioned two BCC blocks are inserted into the first signal fields 2121 and 2131 and then an BCC block for an STA allocated to the data field 2141 of the first data channel is inserted. Thereafter, a BCC block for an STA allocated to the data field 2143 of the third data channel is inserted.

In FIG. 21, although a frequency band at which the second control fields 2120 and 2130 are transmitted is indicated by four "SIG-B channels" and a frequency band at which the data field 2140 is transmitted is indicated by four "data channels", it may be interpreted that each SIG-B channel and data channel correspond to the four frequency bands described in FIG. 7. That is, as described in the example of FIG. 7, each boundary surface of the data channel and each boundary surface of the SIG-B channel may not be completely aligned. However, when it is described based on a corresponding 20 MHz frequency band, the second control fields 2121 and 2131 corresponding to a first frequency band correspond to the two data fields 2141 and 2143 corresponding to the first/third frequency bands. Further, the second control fields 2122 and 2132 corresponding to the second frequency band correspond to the two data fields 2142 and 2144 corresponding to the second/fourth frequency bands.

Figure 22:
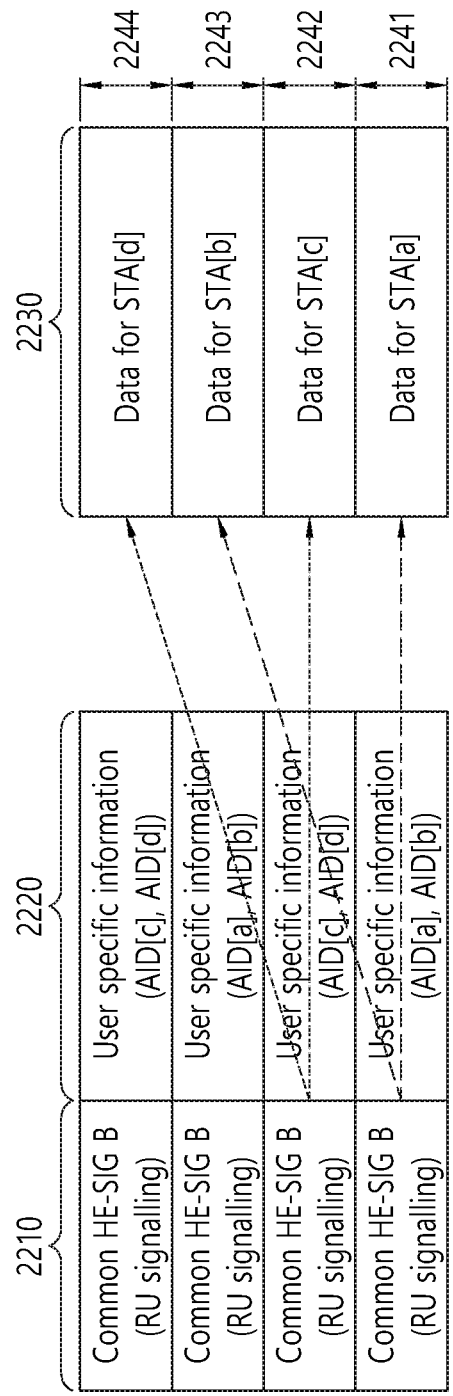
FIG. 22 illustrates an example of SIG-B used for 80 MHz transmission.

FIG. 22 illustrates an example of SIG-B used for 80 MHz transmission.

The example of FIG. 21 is further specified in the example of FIG. 22. As shown in FIG. 22, the SIG-B includes a common field 2210 and a user specific field 2220. Further, the common field 2210 and user specific field 2220 of the SIG-B include four fields respectively corresponding to four frequency bands 2241, 2242, 2243, and 2244 each of which corresponds to a 20 MHz channel. The four distinctive SIG-B fields in FIG. 22 may be called in various terms such as first to fourth signal fields or the like.

In case of being divided in unit of a 20 MHz band as shown in FIG. 22, it is preferable that the SIG-B corresponding to the first frequency band 2241 is mapped to data fields of first and third frequency bands, and the SIG-B corresponding to the second frequency band 2242 is mapped to data fields of the second and fourth frequency bands. Further, the SIG-B corresponding to the first frequency band 2241 may be duplicated to construct the SIG-B corresponding to the third frequency band 2243, and the SIG-B corresponding to the second frequency band 2242 may be duplicated to construct the SIG-B corresponding to the fourth frequency band 2244.

Referring to FIG. 22, the common field corresponding to the first frequency band 2241 includes an RU signalling field, and this is used for the data field corresponding to the first and third frequency bands. Each RU signalling field shown in FIG. 22 may be constructed of one look-up table with respect to 20 MHz. Since the common field corresponding to the first frequency band 2241 corresponds to the data field corresponding to two frequency bands, two RU signalling fields may be simultaneously transmitted. A first field of the two RU signalling fields indicates the data field corresponding to the first frequency band 2241, and a second field indicates the data field corresponding to the third frequency band 2243.

The same technical feature is also applied to the SIG-B corresponding to the second frequency band 2242. That is, the SIG-B corresponding to the second frequency band 2242 may include two RU signalling fields for the data field corresponding to the second and fourth frequency bands 2242 and 2244.

The two RU signalling fields may correspond to one unified look-up table instead of being present independently with each other. That is, it may be designed to instruct non-contiguous 40 MHz allocation.

As described above, the SIG-B corresponding to the first and second frequency bands is preferentially duplicated on the third and fourth frequency bands.

The aforementioned example may be modified in various manners. For example, an additional technique feature described below may be applied to the RU look-up table and the RU signalling field.

For example, RUs corresponding to a 20 MHz band may be constructed by combining 26-RU, 52-RU, 106-RU (or 242-RU, aggregate 484-RU, 996-RU). In this case, if the number of combinations is less than or equal to 32, the RU look-up table may be constructed through 5-bit information. In this case, if it is configured to use a MU-MIMO scheme only for at least 106-RU, about 12 cases are present regarding 106-RU allocation. That is, if a 3-bit or 4-bit MU-MIMO indicator (i.e., MU-MIMO field) is additionally used signalling may be performed with respect to 20 MHz for: 1) information regarding a combination of RUs; and 2) information regarding an RU to which MU-MIMO is applied.

In this case, signalling related to the MU-MIMO scheme may be actualized as follows.

For example, if the 106-RU is included in the combination of RUs indicated by 5-bit information, a 3-bit or 4-bit MU-MIMO indicator (i.e., MU-MIMO field) may be actualized as follows.

1) 3-bit MU-MIMO indicator: The total number of user STAs that can be multiplexed to the 106-RU is 8. For example, the total number of users can be indicated. More specifically, "000" and "111" may respectively indicate that 1 and 8 user STAs are multiplexed to the 106-RU according to the MU-MIMO scheme. That is, the number of user STAs to be multiplexed according to the MU-MIMO scheme may be indicated while indicating that the MU-MIMO scheme is applied.

For example, if two 106-RUs are included in the combination of RUs indicated by the 5-bit information, the MU-MIMO indicator (i.e., MU-MIMO field) may be actualized as follows.

2) 4-bit MU-MIMO indicator

First, a user STA to be multiplexed to each 106-RU may be indicated in unit of 2 bits. In this case, a combination of the number of users that can be multiplexed to each 106-RU may be limited, and may be configured as follows for example.

a) 2 bits for a first 106-RU may indicate 4 user STAs, and 2 bits for a second 106-RU may indicate 4 user STAs.

b) The combination of user STAs that can be allocated to each 106-RU may be indicated by using 16 cases expressed with 4-bit information.

E.g. (2,6), (4,4), (8,8), . . .

The combination of user STAs that can be allocated to each 106-RU may be indicated by using 16 cases expressed with 3-bit information.

E.g. (2,6), (4,4), (8,8) . . .

The aforementioned example of FIG. 15 to FIG. 22 is an example regarding first to fourth channels (or first to fourth frequency bands) continuous to each other in an 80 MHz band. In addition, a second control field (e.g., SIG-B) corresponding to a first channel (i.e., a 20 MHz channel) having a smallest frequency index among 80 MHz bands indicates RU allocation information regarding a data field corresponding to first and third channels. In addition, an SIG-B corresponding to a second channel (i.e., a 20 MHz channel) continuous to the first channel indicates RU allocation information for a data field corresponding to the second and fourth channels. In addition, an SIG-B corresponding to a third channel (i.e., a 20 MHz channel) continuous to the second channel is a duplication of the SIG-B corresponding to the first channel. In addition, an SIG-B corresponding to a fourth channel (i.e., a 20 MHz channel) continuous to the third channel is a duplication of the SIG-B corresponding to the second channel.

In other words, there is a mapping rule between a channel of the second control field (SIG-B) and a channel of the data field. For example, the example of FIG. 22 uses a mapping rule in which the first channel of the second control field (SIG-B) is mapped to the first/third channel of the data field. In addition, according to the mapping rule of FIG. 22, the second channel of the second control field (SIG-B) is mapped to the second/fourth channel of the data field.

This mapping rule may be changed by considering load balancing for each 20 MHz channel. Hereinafter, an additional embodiment of the mapping rule between the channel of the second control field (SIG-B) and the channel of the data field will be described.

Figure 23:
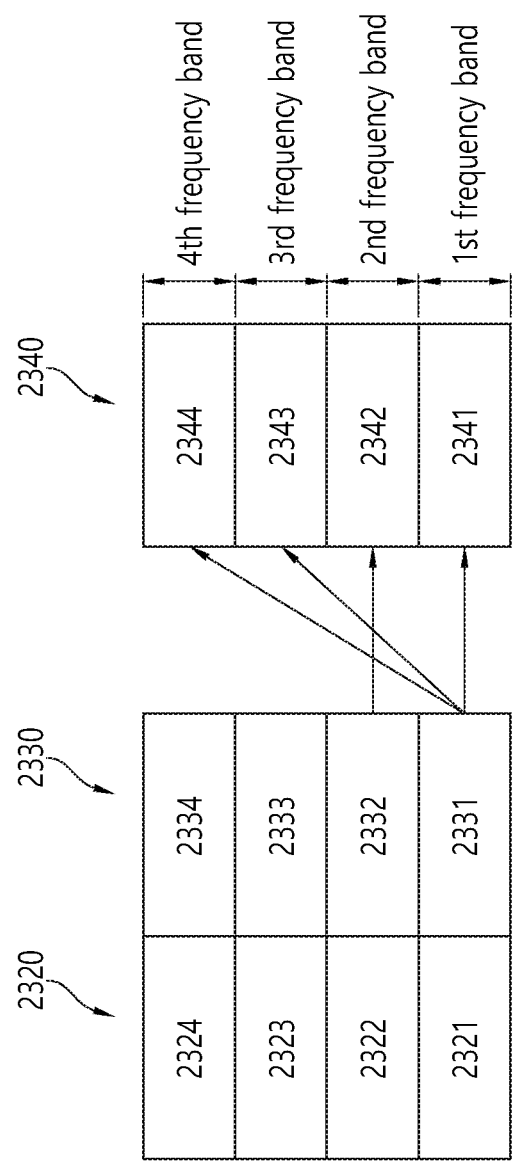
FIG. 23 illustrates an example of performing 80 MHz transmission by considering load balancing.

FIG. 23 illustrates an example of determining a mapping rule by considering load balancing according to an example of the present embodiment.

A PPDU including a user-common field 2320 and a user-specific field 2330 and a PPDU including a data field 2340 are shown in FIG. 23. The SIG-B field and the data field correspond to first to fourth channels (or first to fourth frequency bands). That is, the example of FIG. 23 includes a field used in the example of FIG. 21.

For example, a 242-type RU may be allocated to a specific 20 MHz data channel (e.g., the first frequency band of FIG. 23), and a 26-type RU (e.g., 26-RU, 52-RU, etc.) may be allocated to another 20 MHz channel (e.g., the second frequency band of FIG. 23). In this case, since the number of STAs allocated for the second frequency band increases, an overhead of SIG-B for the second frequency band may increase. When four SIG-B fields corresponding to first to fourth channels are configured as shown in FIG. 23, since the SIG-B field must be aligned with a longest field, a load for SIG-B must be balanced.

That is, when the overhead increases in the second channel (i.e., the second frequency band), SIG-Bs 2321 and 2331 corresponding to the first channel (i.e., the first frequency band) may allocate data fields 2341, 2343, and 2344 corresponding to the first, third, and fourth channels (i.e., the first, third, and fourth frequency bands). Accordingly, the number of SIG-B symbols for a specific channel can be prevented from being excessively increased.

That is, according to the mapping rule of FIG. 23, the first channel of SIG-B is mapped to the first, third, and fourth channels of the data field. In addition, the second channel of SIG-B is mapped to the second channel of the data field. In the example of FIG. 23, the SIG-Bs 2321 and 2331 corresponding to the first channel may also be duplicated to SIG-B 2323 and 2333 corresponding to the third channel.

An example of this specification proposes a scheme of signaling this mapping rule. For example, a first control field (e.g., SIG-A) may signal the aforementioned mapping rule.

An example of combining data channels in which an SIG-B corresponding to a specific 20 MHz provides RU allocation information is as follows. The following description relates to the SIG-Bs 2321 and 2331 corresponding to the first channel and SIG-Bs 2322 and 2332 corresponding to the second channel. Since the SIG-B corresponding to the third/fourth channel is duplicated, an additional description on SIG-B corresponding to the third/fourth channel is omitted.

To signal the mapping rule, two pieces of information may be sequentially provided. An order of the provided two pieces of information may be predefined. Specifically, the number of data channels (hereinafter, referred to as "N_1") indicated by the SIG-Bs 2321 and 2331 of the first channel may be transmitted first, and then the number of data channels (hereinafter, referred to as "N_2") indicated by the SIG-Bs 2322 and 2332 of the second channel may be transmitted. For example, a combination (N_1, N_2) of N_1 and N_2 may be at least one of (2, 2), (1, 3), (3, 1).

case-1) In case of (N_1, N_2)=(2, 2)

Load balancing is not applied in this case. That is, as shown in FIG. 22, the SIG-Bs 2321 and 2331 of the first channel may provide RU allocation information for the data fields 2341 and 2343 of the first/third channels, and the SIG-Bs 2322 and 2332 may provide RU allocation information for the data fields 2342 and 2344 of the second/fourth channels.

case-2) In case of (N_1, N_2)=(1, 3)

Load balancing is applied in this case. The SIG-Bs 2321 and 2331 of the first channel may provide only RU allocation information for the first data field 2341, and the SIG-Bs 2322 and 2332 of the second channel may provide RU allocation information for the second to fourth data fields 2342, 2343, and 2344. That is, comparing with a case of not applying load balancing, it can be understood that the SIG-Bs 2322 and 2332 of the second channel additionally provide RU allocation information for the third data field 2343. In this case, the additionally provided allocation information may be located at the end of SIG-B of a corresponding channel.

In another example, a channel additionally indicated by the SIG-Bs 2322 and 2332 of the second channel may not be fixed to the third data field 2343. That is, the data field of a channel having a smaller number of user STAs may be indicated between the first and third data channels. For example, if the number of user STAs allocated to the first data channel is smaller, the SIG-Bs 2322 and 2332 of the second channel may indicate the first data field 2341.

case-3) In case of (N_1, N_2)=(3, 1)

Load balancing is also applied in this case. Specifically, the SIG-Bs 2321 and 2331 of the first channel may provide RU allocation information for the first, third, and fourth data fields 2341, 2343, and 2344. In addition, the SIG-Bs 2322 and 2332 of the second channel may provide only RU allocation information for the second data field 2342. That is, comparing with a case of not applying load balancing, it can be understood that the SIG-Bs 2321 and 2331 of the first channel additionally provide RU allocation information for the fourth data field 2344.

In another example, a channel additionally indicated by the SIG-Bs 2321 and 2331 of the first channel may not be fixed to the fourth data field 2344. That is, the data field may be indicated by a channel to which a smaller number of user STAs are allocated between the second and fourth data channels. For example, if the number of user STAs allocated to the second data channel is smaller, the SIG-Bs 2321 and 2331 of the first channel may indicate the second data field 2342.

Some of the examples of Case-2 and Case-3 relate to an example in which the mapping rule is changed according to the number of user STAs allocated to the data channel. The number of STAs allocated to the data channel may be indicated by using the number of RU signaling fields transmitted on the user-common field 2320 of SIG-B and/or the user-specific fields 2330 of SIG-B. A receiving STA may implicitly know a location of the data channel additionally allocated in other 20 MHz SIG-B channels by using corresponding information.

The aforementioned three cases (case 1 to case 3) may be implemented as an "HE-SIG-B channel configuration" field in the first control field or the common control field (e.g., SIG-A). The field may be implemented with 2-bit information. That is, the aforementioned case 1, case 2, and case 3 may be respectively indicated by "00" bits, "01" bits, and "10" bits.

If the "HE-SIG-B channel configuration" field indicates "10", the mapping rule of FIG. 23 is indicated.

If the "HE-SIG-B channel configuration" field indicates "11", this may indicate that a specific 20 MHz SIG-B channel allocates all 20 MHz data channels. In this case, a specific SIG-B channel which allocates all 20 MHz data channels may be fixed to a specific 20 MHz channel (e.g., a channel corresponding to a first frequency band, or a primary 20 MHz channel). Alternatively, it may be indicated by a specific bit (e.g., a 1-bit flag bit) in the first control field/common control field (e.g., SIG-A), and may be indicated by L-SIG or RL-SIG configured prior to SIG-A.

Figure 24:
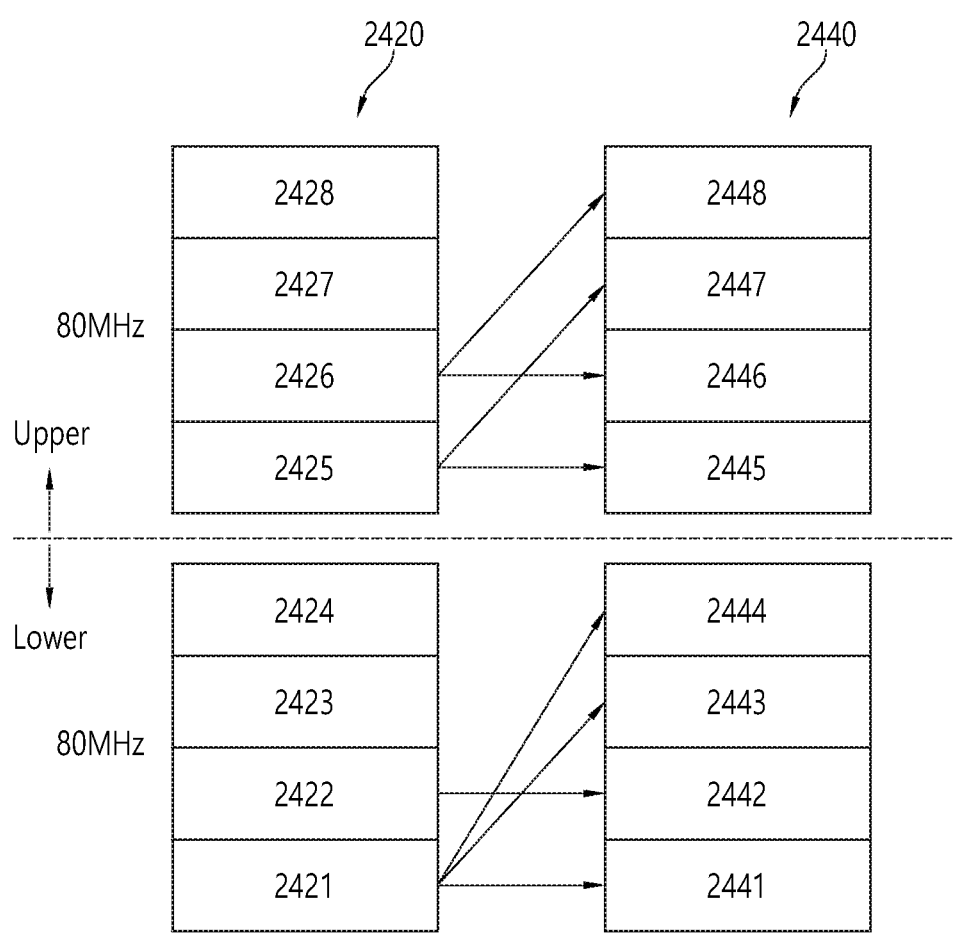
FIG. 24 illustrates an example of performing 160 MHz transmission by considering load balancing.

FIG. 24 illustrates an example of applying load balancing to 160 MHz transmission. The aforementioned load balancing is also applicable to 160 MHz transmission. The 160 MHz transmissions may be performed through a lower 80 MHz band and an upper 80 MHz band.

An example in which load balancing is used for 160 MHz transmission according to the present specification is as follows.

EXAMPLE 1

When load balancing is applied to the 160 MHz transmission, data fields 2441, 2442, 2443, and 2444 of the lower 80 MHz band are preferably allocated by SIG-Bs 2421, 2422, 2423, and 2424 of the lower 80 MHz band, and data fields 2445, 2446, 2447, and 2448 of the upper 80 MHz band are preferably allocated by SIG-Bs 2425, 2426, 2427, and 2428 of the upper 80 MHz band. On the other hand, since an SIG-A preferably covers the entire 160 MHz band, it may be duplicated in unit of 20 MHz to cover the entire 160 MHz band.

The "HE-SIG-B channel configuration" used in the 80 MHz transmission may also be modified and used in the 160 MHz transmission. The "HE-SIG-B channel configuration" for 160 MHz may be implemented with 3-bit information.

Specifically, information transmitted through the "HE-SIG-B channel configuration" may be classified into M_1 and M_2. M_1 may indicate the number of data channels indicated by the SIG-Bs 2421 and 2425 of the first channel, and M_2 may indicate the number of data channels indicated by the SIG-Bs 2422 and 2426 of the second channel. Specifically, (M_1, M_2) may be any one of (4, 4), (3, 5), (2, 6), (5, 3), (6, 2). The respective cases may be displayed as "000", "001", "010", "011", "100", etc.

In the example of FIG. 24, the SIG-Bs 2423 and 2427 of the third channel are configured by duplicating the SIGs 2421 and 2425 of the first channel, and the SIG-B 2424 and 2428 of the fourth channel are configured by duplicating the SIGs 2422 and 2425 of the second channel. Accordingly, additional signaling is not necessary for the SIG-B of the third/fourth channel.

In case of FIG. 24, it may be indicated as (M_1, M_2)=(5, 3). In this case, it may be set as "HE-SIG-B channel configuration"="011". Meanwhile, in case of not applying load balancing, it may be expressed as (M_1, M_2)=(4, 4).

Referring to FIG. 24, M_1 is set to "5" since the SIG-B 2421 of the first channel of the lower 80 MHz allocates three 20 MHz data channels 2441, 2443 and 2444, and the SIG-B 2425 of the first channel of the upper 80 MHz allocates two 20 MHz data channels 2445 and 2447. In addition, M_2 is set to "2" since the SIG-B 2422 of the lower 80 MHz channel allocates one 20 MHz data channel 2442 and the SIGB 2426 of the upper 80 MHz second channel is allocated to two 20 MHz data channels 2446 and 2448.

However, if M_1="5", it is necessary to additionally determine whether the SIG-B 2421 of the first channel of the lower 80 MHz indicates three data channels and the SIG-B 2425 of the upper 80 MHz indicates two data channels, or vice versa.

For this, if it is indicated as M_1="5", an example is possible in which SIG-B of a predetermined band such as lower 80 MHz, upper 80 MHz, and primary 80 MHz bands always indicates three data channels.

Alternatively, it may be identified by inserting a 1-bit indicator to the L-SIG/RL-SIG field in SIG-A or prior thereto. The 1-bit indicator may be referred to as an "SIGB load" field.

Alternatively, one bit may be added to the "HE-SIG-B channel configuration", and the lower or upper 80 MHz band may be indicated by using the added 1 bit.

Hereinafter, a case of (M_1, M_2)=(2, 6) will be described. In this case, each of the first SIG-B 2421 on the lower 80 MHz and the first SIG-B 2425 on the upper 80 MHz may allocate one data channel 2441/2445, and each of the second SIG-B 2425 on the lower 80 MHz and the second SIG-B 2426 on the upper 80 MHz may allocate three data channels 2442/2446, 2443/2447, and 2444/2448.

Hereinafter, a case of (M_1, M_2)=(1, 7) will be described. This is a case where one of the first SIG-B 2421 on the lower 80 MHz and the first SIG-B 2425 on the upper 80 MHz allocates one data channel, and all of the remaining data channels are indicated by the second SIG-Bs 2422 and 2426 on the lower/upper 80 MHz.

It is also possible to implement the "SIGB channel configuration" with 2 bits by using only one part of the above combination. For example, it may be implemented with 2 bits as combinations of (4, 4), (3,5), and (5,3). The aforementioned "SIGB load field" may be added to approximately the 2 bits to use 3-bit signaling in total.

Similarly to load balancing for 80 MHz, information on whether the data channel additionally informed from another 20 MHz SIG-B channel is the first/third data channel or the second/fourth data channel may be known through the user-common field of SIG-B or the user-specific field (or the number of symbols of SIG-B). In addition, accordingly, a receiving STA may recognize which data channel includes a smaller number of reception STAs.

An example of 160 MHz transmission described above may be modified as follows.

Specifically, it is also possible for SIG-B of the lower 80 MHz to allocate/indicate the data field of the upper 80 MHz. SIG-A may transmit channel combination signaling including all 160 MHz bands, and may support allocation for the data channel of a full band of 160 MHz without distinction of the upper/lower 80 MHz SIG-B channels.

(M_1, M_2) proposed above may be applied by equally considering a case where it is informed by one SIG-B (i.e., the first SIG-B or the second SIG-B). For example, in case of (M_1, M_2)=(3,5), three first SIG-Bs and five second SIG-Bs are signaled, which may indicate that three first SIG-Bs are used and the remaining channels are implicitly used in the second SIG-B. This is useful to indicate a greater number of (e.g., 1 to 8) 20 MHz channels. For example, 3 bits may indicate up to eight 20 MHz channels. In this case, an additional bitmap or signaling may be designed more specifically to distinguish the channel proposed above together with information indicating the number of the first SIG-Bs or the second SIG-Bs. For example, specific channel index information with one or more bits may be transmitted together, and an 8-bit bitmap capable of covering eight 20 MHz channels in total may be additionally transmitted.

The method proposed above can also be supported independently for the SIG-A and SIG-B of each of the upper 80 MHz and the lower 80 MHz. For example, the SIG-A of each 80 MHz may independently transmit "SIGB channel configuration" information of a corresponding 80 MHz and the SIG-B to which this is instructed may apply the proposed method independently in the corresponding 80 MHz channel.

In this case, a 2-bit SIGB channel configuration field per 80 MHz may be included in an HE-SIG-A. This case may be used when independent HE-SIG-A is configured for each 80 MHz.

The aforementioned example of FIG. 23 and FIG. 24 may be summarized as follows.

The example of FIG. 23 and FIG. 24 proposes a new mapping rule between the SIG-B field and the data field for load balancing. The aforementioned mapping rule may be applied to various bands. Hereinafter, for convenience of explanation, a case of 80 MHz transmission will be described.

For example, in case of using 80 MHz transmission, the entire 80 MHz band is divided into a first channel (i.e., a first frequency band) to a fourth channel (i.e., a fourth frequency band) in a descending order of a frequency index starting from a 20 MHz channel having a lowest frequency index. In addition, an SIG-B field corresponding to an Nth channel (i.e., an Nth SIG-B channel) may be referred to as an Nth signal field, and a data field corresponding to the Nth channel (i.e., the Nth data channel) may be referred to as an Nth data field.

As a result, a PPDU for 80 MHz transmission is transmitted through the first to fourth channels (i.e., the first to fourth frequency bands). In addition, the PPDU includes first to fourth signal fields, and includes first to fourth data fields.

Meanwhile, the PPDU may include a common control field (i.e., SIG-A), and the common control field may include a mapping identifier in a frequency mapping rule. An example of the mapping identifier includes (N_1, N_2) of FIG. 23, (M_1, M_2) of FIG. 24, or the aforementioned "HE-SIG-B channel configuration" field.

Each of the first to fourth signal fields includes a user-common field and a user-specific field as shown in FIG. 8 or the like. The user-common field may indicate RU allocation information for the data field corresponding to the signal field. The user-specific field may indicate identification information of an STA allocated to the data field corresponding to the signal field.

The following example proposes a technique used when a specific 20 MHz band (or at least 40 MHz band) is nullified. Specifically, in an overlapping basic service set (OBSS) environment, no transmission may be achieved in the specific 20 MHz band (or at least 40 MHz band). That is, a specific preamble (i.e., a PHY layer preamble) may be punctured or nullified. In the aforementioned example, since RU allocation information and STA identification information of several bands are transmitted through a 20 MHz band (indicated by a second frequency band, a second SIG-B channel, or the like in the aforementioned example) continuous to the primary 20 MHz band, there may be a problem in that the data field cannot be correctly decoded if the 20 MHz band is nullified. In other words, when the mapping rule between the SIG-B channel and the data channel described in FIG. 22 is used as a basic rule, there may be a problem in that a case where a specific channel is nullified/punctured cannot be supported.

The following example proposes a method of newly defining a mapping relation between a signal field (e.g., SIG-B field) and a data field so that the data field is correctly decoded even if a specific 20 MHz band is nullified.

Figure 25:
FIG. 25 is an example of transmitting a PPDU by using first to fourth channels continuous to each other in an 80 MHz band.

Similarly to the aforementioned example, one example of FIG. 25 is an example of transmitting a PPDU by using first to fourth channels which are continuous to each other in an 80 MHz band. A data field of the PPDU may be transmitted through the first to fourth frequency bands, and a signal field (e.g., SIG-A and/or SIG-B) of the PPDU may be transmitted through the first to fourth signal channels. The first to fourth signal channels of FIG. 25 may correspond to the first to fourth SIG-B channels shown in FIG. 21, and the first to fourth frequency bands of FIG. 25 may correspond to the first to fourth data channels of FIG. 21.

In the example of FIG. 25, the 20 MHz channel corresponding to a first SIG-B channel 2511 may be a primary 20 MHz channel. In this case, an SIG-B transmitted through the first SIG-B channel 2511 includes RU allocation information and STA identification information for a data field transmitted through all frequency bands, i.e., first, third, and fourth frequency bands 2561, 2563 and 2564. In addition, an SIG-B transmitted through a fourth SIG-B channel 2514 preferably includes RU allocation information and STA identification information for only a data field transmitted through the fourth frequency band 2564. An SIG-B transmitted through a third SIG-B channel 2513 is preferably duplicated with the SIG-B of the first SIG-B channel.

In addition, as illustrated, RU allocation information for the first frequency band is preferentially included in a common control field of the SIG-B transmitted through the first SIG-B channel 2511, and RU allocation information for the fourth frequency band may be included last. In addition, as illustrated, STA identification information for the first frequency band is preferentially included in a user specific control field of an SIG-B transmitted through the first SIG-B channel 2511, and STA identification information for the fourth frequency band may be included last.

Unlike the example of FIG. 25, all SIG-Bs may include information regarding the remaining frequency bands except for the second frequency band. However, it is inefficient to include information regarding all frequency bands in an SIG-B in a situation of not knowing a load of a user specific SIG-B field. Accordingly, in the example of FIG. 25, when secondary 20 MHz band 2512 and 2562 are nullified or punctured by considering an operation of a terminal which decodes a 40 MHz SIGB, a method is proposed in which information (RU allocation information, STA identification information) regarding the fourth frequency band is included in an SIG-B of the primary 20 MHz channel by modifying the aforementioned example of FIG. 22. Information regarding the 20 MHz channel to be nullified or punctured may be displayed through information of SIG-A, or may be displayed by combining the information of SIG-A and information of SIG-B.

The method proposed in FIG. 25 can minimize an implementation burden and decrease an unnecessary overhead by adding only information regarding the 20 MHz channel to be nullified/punctured to a specific 20 MHz SIGB channel without having to significantly change the mapping rule (e.g., the rule of FIG. 22) between the SIG-B channel and the data channel, which is already proposed in the present specification.

FIG. 26 is an example of applying the scheme of FIG. 25 to a 160 MHz band. As illustrated, the example of FIG. 25 may be applied when a primary 20 MHz channel 2611 is included in a lower 80 MHz band 2601 and nulling or puncturing is applied to a 20 MHz band (e.g., a secondary channel) continuous to the primary 20 MHz channel.

That is, an SIG-B transmitted through the first SIG-B channel 2611 includes RU allocation information and STA identification information for a data field transmitted through all frequency bands, i.e., first, third, and fourth frequency bands 2661, 2663 and 2664 of a lower 80 MHz band and fifth, sixth, seventh, and eighth frequency bands 2671, 2672, 2673, and 2674. The first SIG-B channel 2611 is duplicated to the third SIG-B channel 2613 of the lower 80 MHz band and the first/third SIG-B channels 2621 and 2623 of the upper 80 MHz band.

In addition, an SIG-B transmitted through a fourth SIG-B channel 2614 of the lower 80 MHz band includes only RU allocation information and STA identification information for a data field transmitted through the fourth frequency band 2664 of the lower 80 MHz band and the second/fourth frequency bands 2672 and 2674 of the upper 80 MHz band. The fourth SIG-B channel 2614 is duplicated to the second/fourth SIG-B channels 2622 and 2624 of the upper 80 MHz band.

That is, similarly to the example of FIG. 25, it is proposed that the SIG-B transmitted through the first SIG-B channel 2611 additionally includes RU allocation information and STA identification information for all frequency bands while equally applying a mapping rule (e.g., the rule of FIG. 22) between the SIG-B channel and the data channel, which is already proposed in the present specification.

In the first SIG-B channel 2611, an order of including information on the first, third, and fourth frequency bands 2661, 2663 and 2664 of the lower 80 MHz band and information on the fifth, sixth, seventh, and eighth frequency bands 2671, 2672, 2673, and 2674 may be defined as follows.

First, as shown in FIG. 26, there is a method in which information on the first and third frequency bands 2661 and 2663 of the lower 80 MHz band and information on the fifth and seventh frequency bands 2671 and 2673 of the upper 80 MHz band are preferentially included in the first SIG-B channel 2611, and thereafter information on the fourth frequency band 2664 of the lower 80 MHz band and information on the sixth and eighth frequency bands 2672 and 2674 of the upper 80 MHz are preferentially included.

Secondly, there is a method in which information on the first, third and fourth frequency bands 2661, 2663 and 2664 of the lower 80 MHz band is first included, followed by information on the fifth, sixth, seventh and eighth frequency bands 2671, 2672, 2673, 2674 of the upper 80 MHz, in that order.

Figure 27:
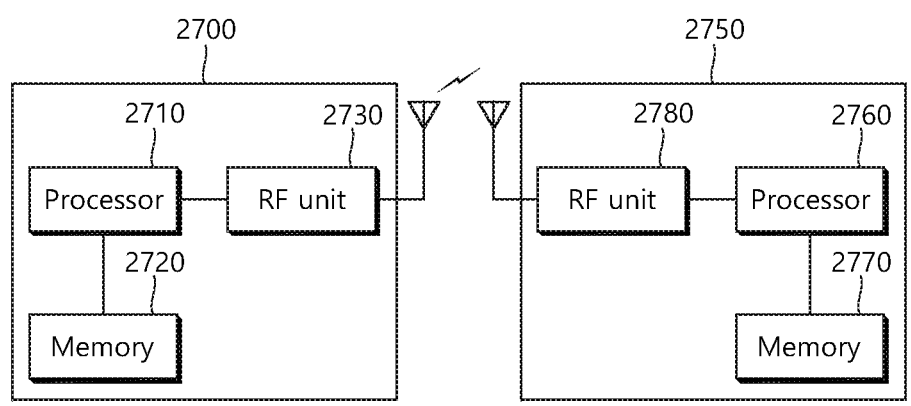
FIG. 27 is a block diagram illustrating a wireless device to which the present embodiment is applicable.

FIG. 27 is a block diagram illustrating a wireless device to which the present embodiment is applicable.

Referring to FIG. 27, the wireless device is an STA capable of implementing the aforementioned embodiment, and may be an AP or a non-AP STA. The wireless device may correspond to the aforementioned user, or may correspond to a transmitting device for transmitting a signal to the user.

An AP 2700 includes a processor 2710, a memory 2720, and a radio frequency (RF) unit 2730.

The RF unit 2730 may be coupled to the processor 2710 to transmit/receive a radio signal.

The processor 2710 may implement the functions, procedures, and/or methods proposed in the present specification. For example, the processor 2710 may perform an operation according to the aforementioned present embodiment. That is, the processor 2710 may perform an operation that can be performed by the AP among operations disclosed in the embodiment of FIG. 1 to FIG. 26.

A non-AP STA 2750 includes a processor 2760, a memory 2770, and an RF unit 2780.

The RF unit 2780 may be coupled to the processor 2760 to transmit/receive a radio signal.

The processor 2760 may implement the functions, procedures, and/or methods proposed in the present specification. For example, the processor 2760 may perform an operation of the non-AP STA according to the aforementioned present embodiment. The processor may perform the operation of the non-AP STA in the embodiment of FIG. 1 to FIG. 26.

The processors 2710 and 2760 may include application-specific integrated circuits (ASICs), other chipsets, logical circuits, data processing devices, and/or converters for mutually converting a baseband signal and a radio signal. The memories 2720 and 2770 may include a read-only memory (ROM), a random access memory (RAM), a flash memory, a memory card, a storage medium and/or other storage devices. The RF units 2730 and 2780 may include at least one antenna to transmit and/or receive the radio signal.

When the above-described embodiment is implemented in software, the above-described scheme may be implemented using a module (procedure, function, etc.) which performs the above function. The module may be stored in the memories 2720 and 2770, and may be executed by the processors 2710 and 2760. The memories 2720 and 2770 may be disposed to the processors 2710 and 2760 internally or externally, and may be connected to the processors 2710 and 2760 using a variety of well-known means.

An embodiment according to the present specification has an advantage of improving a relation between a signal field and a data field. Accordingly, there is an advantage in that reception data is normally demodulated in a receiving station even if a specific frequency band is nullified and thus no field is transmitted.

What is claimed is:

1. A method for transmitting a physical layer protocol data unit (PPDU) in a wireless local area network (WLAN) system, the method comprising:
    configuring, by an access point (AP), the PPDU to be transmitted based on a transmission band including first to eighth frequency bands each being contiguous with one another,
    wherein the second frequency band is nulled,
    wherein the PPDU includes a first signal field to be transmitted on the first frequency band,
    wherein the first signal field includes resource unit (RU) information and station (STA) identification information used for data fields included in the first, third, fifth, seventh, fourth, sixth and eighth frequency bands,
    wherein the first signal field is duplicated in the third, fifth and seventh frequency bands,
    wherein the PPDU includes a fourth signal field to be transmitted on the fourth frequency band,
    wherein the fourth signal field includes RU information and STA identification information used for data fields included in the fourth, sixth and eighth frequency bands, and
    wherein the fourth signal field is duplicated in the sixth and eighth frequency bands; and
    transmitting, by the AP, the PPDU to STAs.

2. The method of claim 1, wherein the duplicated signal fields are transmitted on a same time duration.

3. The method of claim 1, wherein each of the first to eighth frequency bands includes a 20 MHz band.

4. The method of claim 1, wherein
    the RU information is related to a RU location in the transmission band.

5. The method of claim 1,
    wherein
    the STA identification information includes association identifiers (AIDs) of the STAs.

6. An apparatus for transmitting a physical layer protocol data unit (PPDU) in a wireless local area network (WLAN) system, the apparatus comprising:
    a radio frequency (RF) unit for transmitting a radio signal; and
    a processor operatively coupled to the RF unit,
    wherein the processor is configured for:
    configuring the PPDU to be transmitted based on a transmission band including first to eighth frequency bands each being contiguous with one another,
    wherein the second frequency band is nulled,
    wherein the PPDU includes a first signal field to be transmitted on the first frequency band,
    wherein the first signal field includes resource unit (RU) information and station (STA) identification information used for data fields included in the first, third, fifth, seventh, fourth, sixth and eighth frequency bands,
    wherein the first signal field is duplicated in the third, fifth and seventh frequency bands,
    wherein the PPDU includes a fourth signal field to be transmitted on the fourth frequency band,
    wherein the fourth signal field includes RU information and STA identification information used for data fields included in the fourth, sixth and eighth frequency bands, and
    wherein the fourth signal field is duplicated in the sixth and eighth frequency bands; and transmitting the PPDU to STAs.

7. The apparatus of claim 6, wherein the duplicated signal fields are transmitted on a same time duration.

8. The apparatus of claim 6, wherein each of the first to eighth frequency bands includes a 20 MHz band.

9. The apparatus of claim 6, wherein
the RU information is related to a RU location in the transmission band.

10. The apparatus of claim 6, wherein
the STA identification information includes association identifiers (AIDs) of the STAs.

* * * * *